United States Patent [19]

Itoh et al.

[11] Patent Number: 5,291,322
[45] Date of Patent: Mar. 1, 1994

[54] SUPERTWISTED, NEMATIC LIQUID CRYSTAL DISPLAY DEVICE WITH LC BIREFRINGENCE AT LEAST 0.2 AND LC RETARDATION AT LEAST 1 MICROMETER

[75] Inventors: Osamu Itoh, Hitachi; Katsumi Kondo, Katsuta; Jun-ichi Hirakata, Hitachi; Naoki Kikuchi, Mobara, all of Japan

[73] Assignee: Hitachi, Ltd., Tokyo, Japan

[21] Appl. No.: 857,252

[22] Filed: Mar. 25, 1992

[30] Foreign Application Priority Data

Mar. 25, 1991 [JP] Japan .................. 3-059837

[51] Int. Cl.$^5$ .................. G02F 1/1343; G02F 1/1335
[52] U.S. Cl. .................. 359/55; 359/63; 359/73
[58] Field of Search .................. 359/73, 63, 55, 57

[56] References Cited

U.S. PATENT DOCUMENTS

| | | | |
|---|---|---|---|
| 4,844,569 | 7/1989 | Wada et al. | 359/73 |
| 5,044,735 | 9/1991 | Asano et al. | 359/102 |
| 5,048,933 | 9/1991 | Asano | 359/102 |
| 5,056,896 | 10/1991 | Iimura et al. | 359/93 |
| 5,119,220 | 6/1992 | Narita et al. | 359/73 |
| 5,134,507 | 7/1992 | Ishii | 359/73 |
| 5,166,817 | 11/1992 | Ota et al. | 359/73 |
| 5,175,638 | 12/1992 | Kanemoto et al. | 359/73 |
| 5,235,450 | 8/1993 | Yoshimuru et al. | 359/73 |

FOREIGN PATENT DOCUMENTS

| | | | |
|---|---|---|---|
| 61-089521 | 5/1986 | Japan . | |
| 63-151924 | 6/1988 | Japan . | |
| 64-049021 | 2/1989 | Japan . | |
| 0254917 | 10/1989 | Japan | 359/73 |
| 2-118516 | 5/1990 | Japan . | |
| 2-130532 | 5/1990 | Japan . | |
| 0278228 | 11/1990 | Japan | 359/73 |
| 0111812 | 5/1991 | Japan | 359/73 |

Primary Examiner—William L. Sikes
Assistant Examiner—Anita Pellman Gross
Attorney, Agent, or Firm—Antonelli, Terry, Stout & Kraus

[57] ABSTRACT

A liquid crystal display device is disclosed, which comprises a liquid crystal cell including a first substrate having a first electrode, a second substrate having a second electrode, which is opposite to the first substrate, and a nematic liquid crystal layer disposed between the first substrate and the second substrate; a first polarizer disposed outside of the first substrate; a second polarizer disposed outside of the second substrate; and at least one optically anisotropic layer disposed at least one of between the first substrate and the first polarizer and between the second substrate and the second polarizer. The twist angle of the nematic liquid crystal layer is greater than 180°; and the following conditions are fulfilled:

$$(\Delta n_{LC} \cdot d_{LC}) \geq 1 \, \mu m,$$

$$\sum_{i=1}^{m} (\Delta n_i \cdot d_i) < (\Delta n_{LC} \cdot d_{LC}),$$

$$\Delta n_{LC} \geq 0.2,$$

where $\Delta n_{LC}$ represents a birefringence of the nematic liquid crystal; $d_{LC}$ a thickness of the nematic liquid crystal layer; $\Delta n_i$ a birefringence of the optically anisotropic layer; $d_i$ a thickness of the optically anisotropic layer; and m a number of optically anisotropic layers.

36 Claims, 21 Drawing Sheets

F I G. 14
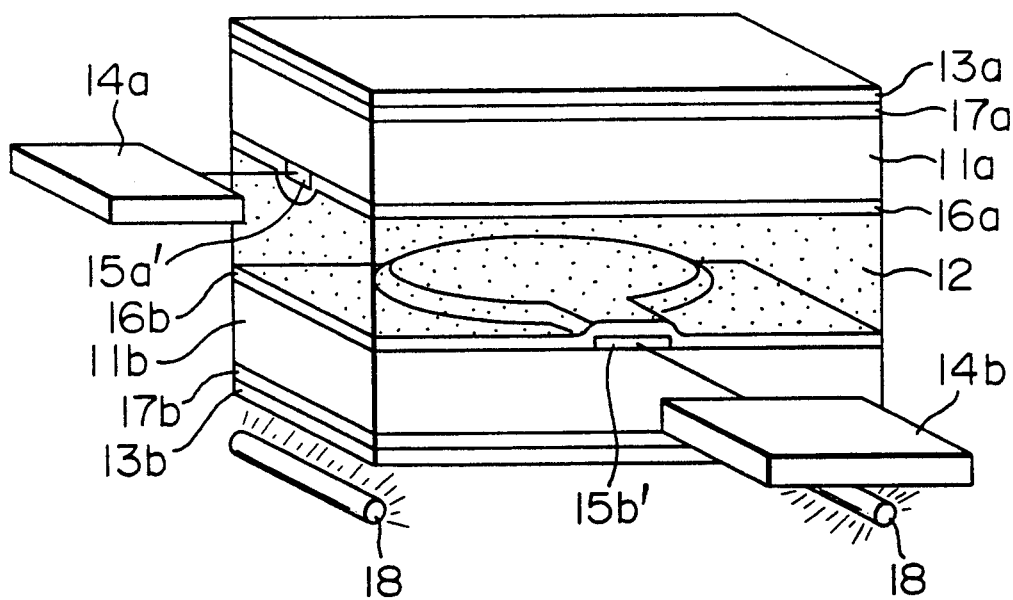

F I G. 20
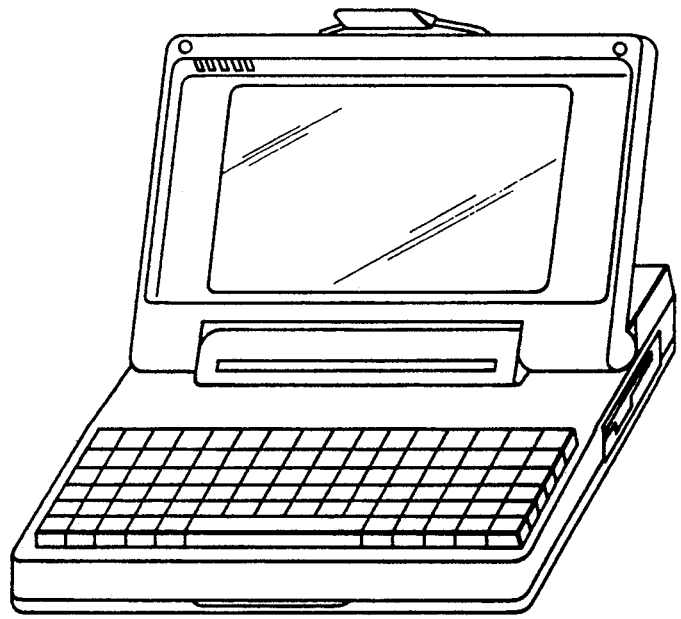

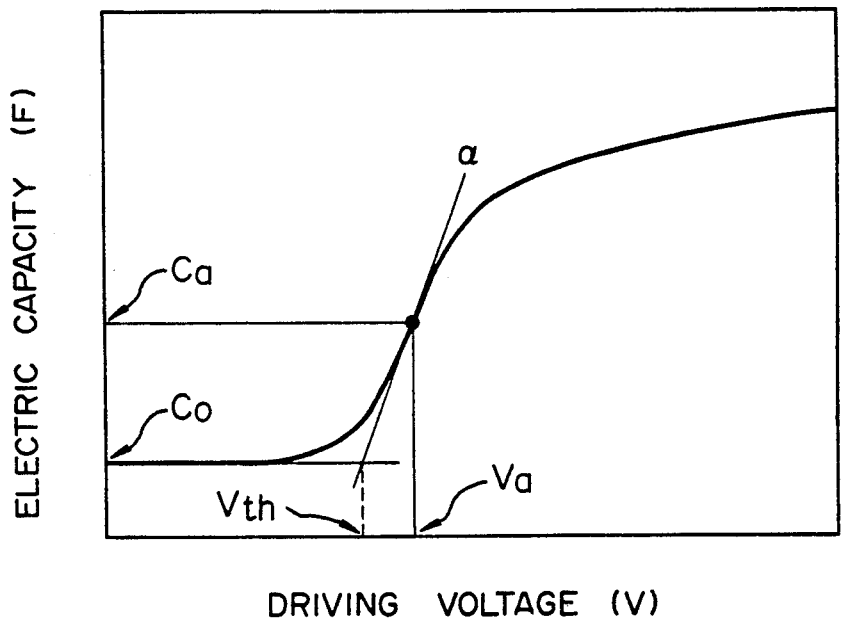
F I G. 21

F I G. 27
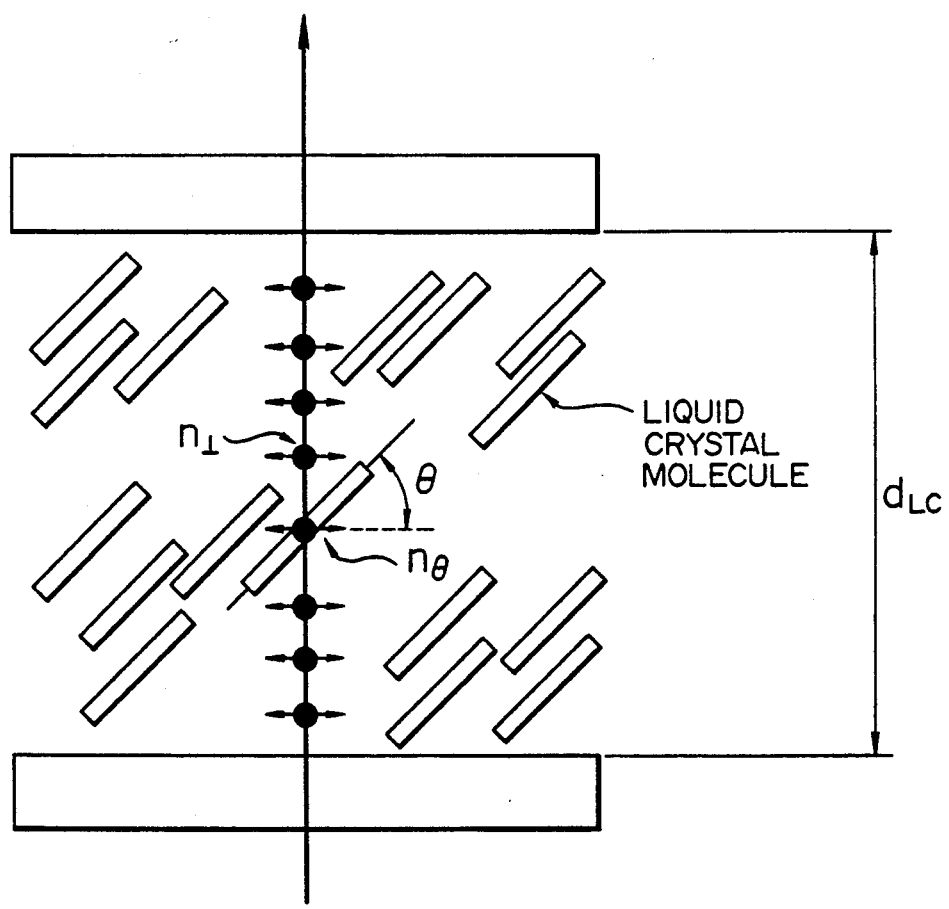

F I G. 30
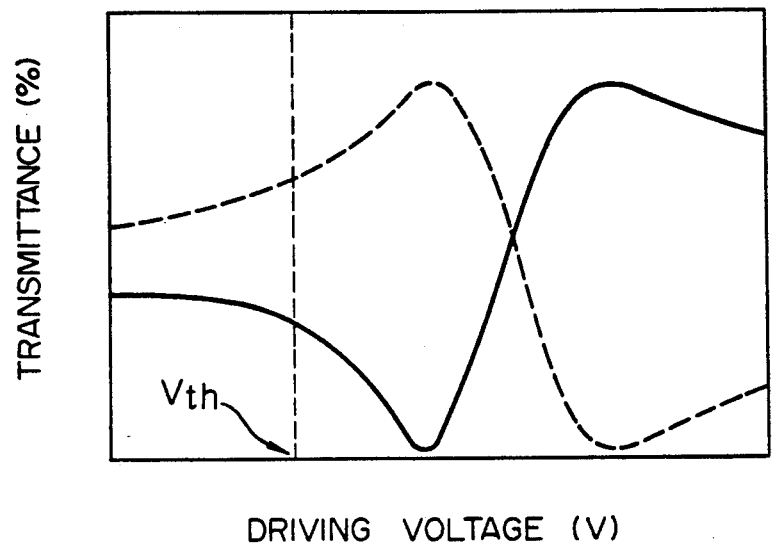
F I G. 31
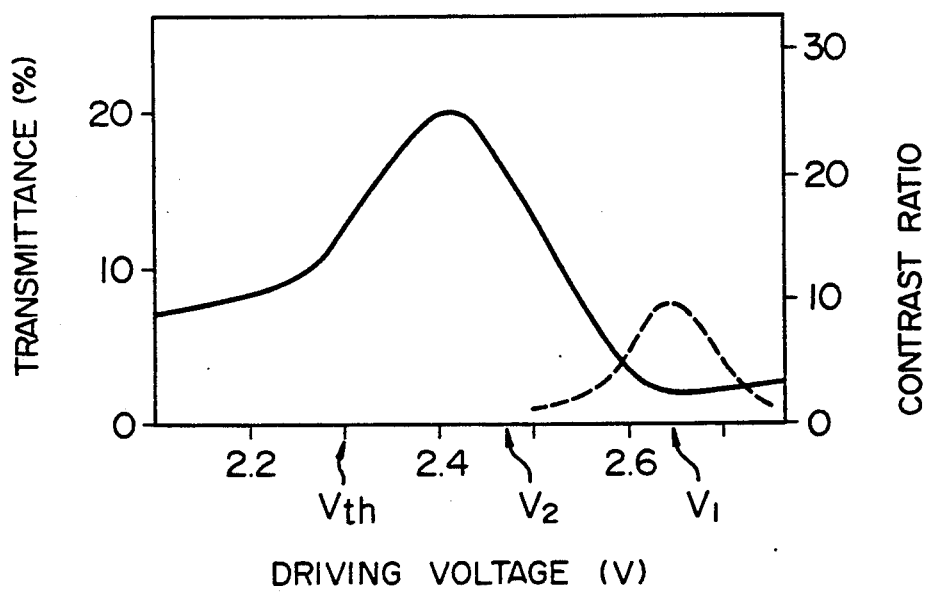

SUPERTWISTED, NEMATIC LIQUID CRYSTAL DISPLAY DEVICE WITH LC BIREFRINGENCE AT LEAST 0.2 AND LC RETARDATION AT LEAST 1 MICROMETER

BACKGROUND OF THE INVENTION

The present invention relates to a super twisted nematic type liquid crystal display device.

In a super twisted nematic type liquid crystal display device the twist angle of the liquid crystal layer thereof is changed from 90°, which is the twist angle of the liquid crystal layer of a prior art twisted nematic type liquid crystal, to another angle over 180°. For this reason, in the super twisted nematic type liquid crystal display device, change of alignment of liquid crystal molecules accompanied by rise of the driving voltage is abrupt and change of transmittance accompanied by rise of the driving voltage is also abrupt. In the super twisted nematic type liquid crystal display device, since highly multiplex driving using X-Y electrodes can be effected, it is widely utilized as an image display device for a lap-top type word processor, a personal computer, etc.

The maximum value of the ratio, which two-valued driving voltages $V_1$ and $V_2$ applied to a pixel can take, is determined unequivocally by the number of scanning lines N of the X-Y electrodes (matrix electrodes) used at effecting a multiplex driving. This relationship is given by a following equation [1];

$$V_2/V_1 = \sqrt{((\sqrt{N} + 1)/(\sqrt{N} - 1))} \quad [1]$$

where it is supposed that $V_1 < V_2$.

FIG. 21 indicates the dependency of the electric capacity of a liquid crystal cell in the super twisted nematic type liquid crystal display device on the driving voltage. As indicated in FIG. 21, the electric capacity of the liquid crystal cell varies rapidly, starting from a certain driving voltage. The inventors of the present invention call the voltage at this time a threshold voltage Vth, which is defined as a following equation [2];

$$Vth = (C_o - C_a + \alpha V_a)/\alpha \ldots [2]$$

where $C_o$ represents the electric capacity of the liquid crystal cell, when an AC driving voltage $V \approx 0$ of frequency 1 kHz is applied to the liquid crystal cell; $V_a$ the driving voltage, when the variation in the electric capacity of the liquid crystal cell is greatest, accompanied by the rise of the driving voltage (frequency 1 kHz); $C_a$ the electric capacity of the liquid crystal cell, when the variation in the electric capacity of the liquid crystal cell is greatest, accompanied by the rise of the driving voltage; and $\alpha$ a rate of variation in the electric capacity of the liquid crystal cell, when the variation in the electric capacity of the liquid crystal cell is greatest, accompanied by the rise of the driving voltage.

The dependency of the electric capacity of the liquid crystal cell on the driving voltage for the super twisted nematic type liquid crystal display device indicated in FIG. 21 reflects the dependency of the alignment of liquid crystal molecules on the driving voltage. FIG. 22A indicates the dependency of the statistical average $\theta$ of the angle formed by the molecular axis of liquid crystal molecules in the liquid crystal cell and the surface of a substrate on the driving voltage of the super twisted nematic type liquid crystal display device. $\theta$ is usually below 10°, when a driving voltage below the threshold voltage Vth is applied thereto, but increases rapidly in the neighborhood of the threshold voltage Vth. Further, on the side of the driving voltage higher than the threshold voltage Vth, variations of $\theta$ are slow.

FIG. 22B indicates the dependency of the response time of the super twisted nematic type liquid crystal display device on the driving voltage. The abscissa in FIG. 22B represents $V_1$, when the response time is measured, supposing that $V_1 < V_2$ and that the ratio of $V_1$ to $V_2$ is constant (in this example, value corresponding to N=200 in Eq. [1]). The response time is longest in the neighborhood of the threshold voltage Vth and it has a value of about 450 ms at that time. Further the response time is shortened on the side of the driving voltage higher than the threshold voltage Vth.

Here, in the present specification, the response time is defined as indicated in FIG. 1. When $V_1 < V_2$, the driving voltage is varied between $V_1$ and $V_2$. The electric capacity of the liquid crystal cell is varied, accompanied thereby, and the amount of this variation is denoted by $\Delta C$ ($= C_2 - C_1$). The rise time $T_R$ is defined as a period of time from the moment, where the driving voltage is changed-over from $V_1$ to $V_2$ to the point of time, where the amount of variation in the electric capacity reaches 0.9 $\Delta C$, while the fall time $T_F$ is defined as a period of time from the moment, where the driving voltage is changed-over from $V_2$ to $V_1$, to the point of time, where the amount of variation in the electric capacity reaches 0.9 $\Delta C$. The response time is defined as the sum of the rise time $T_R$ and the fall time $T_F$.

FIG. 22C indicates the dependency of the transmittance of a prior art super twisted nematic type liquid crystal display device on the driving voltage. This is a super twisted nematic type liquid crystal display device called blue mode. No optical anisotropic layer is mounted on either side of the liquid crystal cell and the product $\Delta n_{LC} \cdot d_{LC}$ of the thickness $d_{LC}$ of the nematic liquid crystal layer by the birefringence $\Delta n_{LC}$ of the nematic liquid crystal is set at about 0.8 μm. The dependency of the transmittance on the driving voltage thus obtained is as indicated in FIG. 22C. As it can be seen therefrom, the transmittance varies rapidly in the neighborhood of the threshold voltage Vth and variations in the transmittance are slow on the side of the voltage higher than the threshold voltage Vth. The contrast ratio is one of parameters representing the display quality of the super twisted nematic type liquid crystal display device together with the brightness. As clearly seen from FIG. 22C, for the contrast ratio a satisfactory value can be obtained, only when the two-valued driving voltages $V_1$ and $V_2$ are set in the neighborhood of the threshold voltage Vth. As clearly seen from FIG. 22C, if the two-valued driving voltages $V_1$ and $V_2$ are set on the side of the voltage higher than the threshold voltage Vth, since variations in the transmittance are slow, no satisfactory contrast ratio can be obtained. Consequently, the prior art super twisted nematic type liquid crystal display device should be driven under the driving voltage corresponding to the longest response time. That is, in the prior art super twisted nematic type liquid crystal display device the response time and the display quality cannot be compatible.

Contrarily thereto, in another prior art super twisted nematic type liquid crystal display device, an optical anisotropic layer is disposed between a liquid crystal cell and a polarizer to intend an improvement of the dependency of the transmittance on the driving voltage (JP-A-63-151924). However the product $\Delta n_i \cdot d_i$ of the thickness $d_i$ of the optical anisotropic layer by the birefringence $\Delta n_i$ is set so as to be almost equal to the product $\Delta n_{LC} \cdot d_{LC}$ of the thickness $d_{LC}$ of the nematic liquid crystal layer by the birefringence $\Delta n_{LC}$ of the nematic liquid crystal. Further the value of $\Delta n_{LC} \cdot d_{LC}$ is set at about 0.8 μm. FIG. 23 indicates the dependency of the transmittance on the driving voltage thus obtained. The scale of the abscissa in FIG. 23 is the same as that used in FIGS. 22A, 22B and 22C. Compared with FIG. 22C, although variations in the transmittance in the threshold voltage Vth are more rapid, variations in the transmittance on the side of the voltage higher than the threshold voltage Vth are as slow as those indicated in FIG. 22C. Consequently it can be driven only in the neighborhood of the threshold voltage Vth. Also in this case, the response time and the display quality cannot be compatible.

Further, in still another prior art super twisted nematic type liquid crystal display device, an optical anisotropic layer (compensating liquid crystal cell) having $\Delta n_i \cdot d_i$ different from $\Delta n_{LC} \cdot d_{LC}$ is used (JP-A-64-49021). The value of $\Delta n_{LC} \cdot d_{LC}$ is set at about 0.9 μm. FIG. 24 indicates the dependency of the transmittance on the driving voltage thus obtained. The scale of the abscissa in FIG. 24 is the same as that used in FIGS. 22A, 22B and 22C. When the case indicated in FIG. 23 is compared with the case indicated in FIG. 22C, the driving voltage, for which the transmittance is smallest, is shifted towards the side of the voltage higher than the threshold voltage Vth. For this reason, both of the bright state and the dark state can display on the side of the voltage higher than the threshold voltage Vth and it is possible to drive the liquid crystal display device on the side of the voltage higher than the threshold voltage Vth, where the response time is shortened. However, the increase in the transmittance on the side of the voltage higher than the smallest point of the transmittance is slow and it is impossible to obtain a satisfactory brightness and contrast ratio. If it is impossible to obtain a satisfactory brightness and contrast ratio, it cannot work as a display device. Also in this case, the response time and the display quality cannot be compatible.

Further, in still another super twisted nematic type liquid crystal display device, the product $\Delta n_{LC} \cdot d_{LC}$ is set at a value over 1.1 μm (JP-A-2-118516). However, no relation between $\Delta n_i \cdot d_i$ and $\Delta n_{LC} \cdot d_{LC}$ is defined. FIG. 25 indicates the dependency of the transmittance on the driving voltage obtained when $\Delta n_i \cdot d_i$ and $\Delta n_{LC} \cdot d_{LC}$ are set so as to be equal to each other. The scale of the abscissa in FIG. 25 is the same as that used in FIGS. 22A, 22B and 22C. The region of the driving voltage, where variations in the transmittance are abrupt, is extended on the higher voltage side. However there exists no minimum on the side of the voltage higher than the threshold voltage Vth. Or, even if there exists, the transmittance at that time doesn't decrease sufficiently. For this reason, it is impossible to drive the liquid crystal display device on the side of the voltage higher than the threshold voltage Vth. Also in this case, the response time and the display quality cannot be compatible.

SUMMARY OF THE INVENTION

For the reasons as described above, in the prior art super twisted nematic type liquid crystal display devices, they were driven in the neighborhood of the threshold voltage Vth, where the response time is longest. For this reason, the response time of the prior art super twisted nematic type liquid crystal display device is about 400 ms. Therefore the response speed is too low to display moving images in a television, etc. and also in the case where they are used as a display device for a word processor or a personal computer, scroll cannot be effected. Further they had a problem that a pointer disappears from an image, when a pointing device is moved rapidly.

The object of the present invention is to provide a liquid crystal display device having a high response speed, by which highly multiplex driving using a matrix electrode can be effected and a high contrast ratio and a bright display can be obtained so that the pointer, etc. described above can be displayed.

In order to achieve the above object, according to an aspect of the present invention, the liquid crystal display device comprises a liquid crystal cell including a first substrate having a first electrode, a second substrate having a second electrode, which is opposite to the first substrate, and a nematic liquid crystal layer disposed between the first substrate and the second substrate; a first polarizer disposed outside of the first substrate; a second polarizer disposed outside of the second substrate; and at least one optical anisotropic layer disposed at least one of between the first substrate and the first polarizer and between the second substrate and the second polarizer; wherein a twist angle of the nematic liquid crystal layer is greater than 180°; and following conditions are fulfilled;

$$(\Delta n_{LC} \cdot d_{LC}) \geq 1 \; \mu m,$$

$$\sum_{i=1}^{m} (\Delta n_i \cdot d_i) < (\Delta n_{LC} \cdot d_{LC}),$$

$$\Delta n_{LC} \geq 0.2,$$

Where $\Delta n_{LC}$ represents a birefringence of the nematic liquid crystal; $d_{LC}$ a thickness of the nematic liquid crystal layer; $\Delta n_i$ a birefringence of the optical anisotropic layer; $d_i$ a thickness of the optical anisotropic layer; and m a number of optical anisotropic layers.

Using this liquid crystal display device, it is possible to obtain a high contrast ratio and a bright display and the response speed is so high that a pointer, etc. moving with a high speed can be displayed In the liquid crystal display device stated above it is preferable that the twist angle of the nematic liquid crystal layer is in a region between 180° and 300°.

In the liquid crystal display device stated above it is preferable that a condition $(\Delta n_{LC} \cdot d_{LC}) \leq 2.5$ μm is fulfilled.

In the liquid crystal display device it is preferable that a following condition is fulfilled;

$$0.25 \leq \left( \sum_{i=1}^{m} (\Delta n_i \cdot d_i) \right) / (\Delta n_{LC} \cdot d_{LC}) \leq 0.75.$$

Instead thereof, another condition;

$$(\Delta n_{LC} \cdot d_{LC}) - \sum_{i=1}^{m} (\Delta n_i \cdot d_i) \geq 0.25 \ \mu m,$$

may be fulfilled. In this case, it is preferable that a condition;

$$(\Delta n_{LC} \cdot d_{LC}) - \left\{ \sum_{i=1}^{m} (\Delta n_i \cdot d_i) \right\} \leq 1.88 \ \mu m,$$

is fulfilled.

In the liquid crystal display device stated above it is preferable that a condition $\Delta n_{LC} \leq 0.3$ is fulfilled.

In the liquid crystal display device stated above it is preferable that the first electrode and the second electrode form matrix electrodes.

In the liquid crystal display device stated above it is preferable that an absorbing axis of the first polarizer and an absorbing axis of the second polarizer form an angle between 60° and 90°, viewed in a direction of a normal to surfaces of the first and the second substrate.

In the liquid crystal display device stated above it is preferable that a fast axis of the optical anisotropic layer forms an angle between 60° and 90° with an alignment direction of the first or the second substrate, to which the optical anisotropic layer is closer than to the other.

In the liquid crystal display device stated above it is preferable that absorbing layers are disposed at a part where the first electrode doesn't exist on a surface of the first substrate and at a part where the second electrode doesn't exist on a surface of the second substrate.

In the liquid crystal display device stated above it is preferable that the nematic liquid crystal layer contains torans.

In the liquid crystal display device stated above it is preferable that in the case where the liquid crystal cell is normally open, the pointer is displayed in a dark state and in the case where the liquid crystal cell is normally closed, the pointer is displayed in a bright state.

According to another aspect of the present invention, the liquid crystal display device comprises a liquid crystal cell including a first substrate having a first electrode, a second substrate having a second electrode, which is opposite to the first substrate, and a nematic liquid crystal layer disposed between the first substrate and the second substrate; a first polarizer disposed outside of the first substrate; a second polarizer disposed outside of the second substrate; and at least one optical anisotropic layer disposed at least one of between the first substrate and the first polarizer and between the second substrate and the second polarizer; wherein the liquid crystal display device has characteristics that, in the case where a first driving voltage $V_1$, which is higher than a threshold voltage, which is in the neighborhood of which alignment of a molecular axis of the nematic liquid crystal varies sharply, is applied between the first electrode and the second electrode, transmittance of the liquid crystal display device is smaller than 2% and in the case where a second driving voltage $V_2$, which is higher than the threshold voltage, is applied between the first electrode and the second electrode, transmittance of the liquid crystal display device is greater than 12%. Here the first driving voltage $V_1$ and the second driving voltage $V_2$ have a relationship $0.87 \leq (V_1/V_2) \leq 1.15$.

Using this liquid crystal display device, it is possible to obtain a high contrast ratio and a bright display and the response speed is so high that a pointer, etc. moving with a high speed can be displayed.

In the liquid crystal display device stated above it is preferable that it has characterized that, denoting values of Stokes' parameters of a polarized state of transmitted light when the first driving voltage $V_1$ is applied thereto by $(S_1, S_2, S_3)$ and values of Stokes' para of the polarized state of the transmitted light when the second driving voltage $V_2$ is applied thereto by $(S_1', S_2', S_3')$ in the case where the polarized state of the transmitted light incident on one polarizer located on the ejection side between the first polarizer and the second polarizer is expressed by Stokes' parameters, they fulfill a condition $0.5 \leq 0.5 \ (1 - S_1 S_1' - S_2 S_2' - S_3 S_3')$.

When driving this liquid crystal display device it is preferable that the minimum value of the driving voltage applied between the first electrode and the second electrode is higher that the threshold voltage described previously.

BRIEF DESCRIPTION OF THE DRAWINGS

FIG. 14 is a schematical perspective view showing a liquid crystal display device according to another embodiment of the present invention;

FIG. 20 is a perspective view showing a notebook type personal computer, on which a liquid crystal display device according to an embodiment of the present invention is mounted;

FIG. 21 is a diagram indicating the definition of the threshold voltage;

FIG. 27 is a diagram showing an outline of the unaxial crystal model;

FIG. 30 is graphs showing a relation between the transmittance and the driving voltage of the liquid crystal display device according to still another embodiment of the present invention; and FIG. 31 is graphs showing relations between the transmittance as well as the contrast ratio and the driving voltage of the liquid crystal display device according to still another embodiment of the present invention.

DESCRIPTION OF THE PREFERRED EMBODIMENTS

Prior to explaining the embodiments of the present invention, at first the principle of the present invention will be explained.

In making the present invention, the inventors thereof have considered a super twisted nematic type liquid crystal display device, going back up to the principle of the display thereof. They have considered it, paying attention particularly to the polarized stated of transmitted light incident on an exit polarizer 15a indicated in FIG. 2. As the result, they have elucidated the reason why the response time and the display quality cannot be compatible in a prior art super twisted nematic type liquid crystal display device. They have further invented a method, by which these two factors are compatible. These will be explained below.

In order to shorten the response time in the super twisted nematic type liquid crystal display device, it may be driven on the side of the voltage higher than the threshold voltage Vth. This reason can be clearly seen from FIG. 22B. Further, in order to obtain a satisfactory display quality under this driving condition, (i) firstly the transmittance should be lowered satisfactorily on the side of the voltage higher than the threshold voltage Vth to effect display in the dark state. (ii) Secondly the transmittance should be satisfactorily raised in a predetermined voltage region from the voltage on the side of the voltage higher than the threshold voltage Vth, where the transmittance is lowered This predetermined voltage region can be determined as defined e.g. by a following equation [3], taking Eq. [1] described previously into account;

$$0.87 \leq (V_1/V_2) \leq 1.15 \qquad [3]$$

where $V_1$ and $V_2$ represent 2-valued driving voltages.

Figure 26:
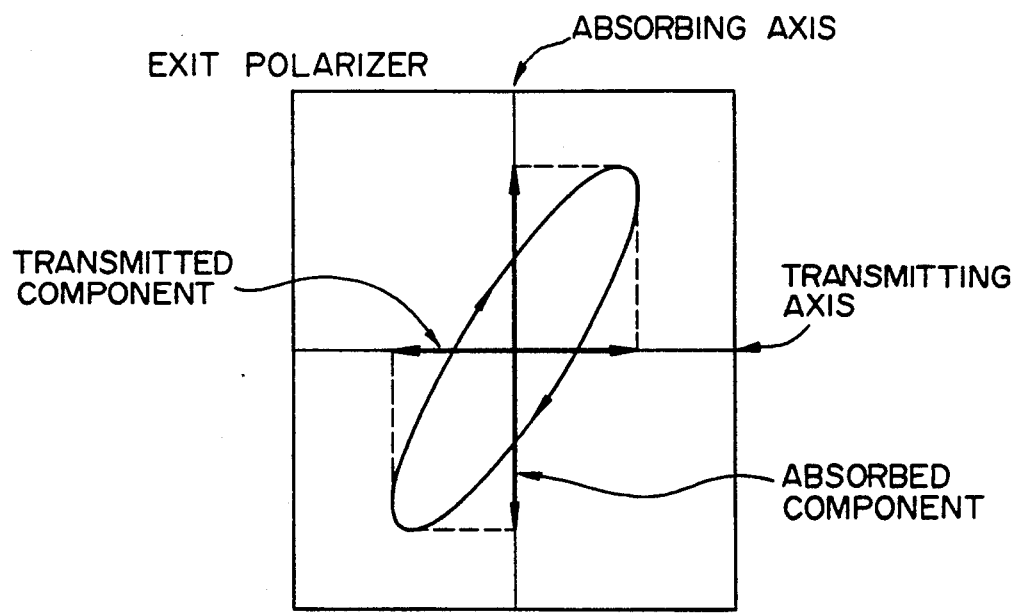
FIG. 26 is a diagram showing a relation between the transmitted component and the absorbed component of polarized light injected into a polarizer.

Concerning the item (i) stated above, to lower the transmittance is equivalent to make the transmitted light incident on the exit polarizer closer to linearly polarized light. FIG. 26 shows the relation among the transmitting axis and the absorbing axis of the exit polarizer and the transmissive component, and the absorbed component of the polarized light injected thereinto. The polarizer has a property to transmit the transmitted component and absorb the absorbed component of the polarized light incident thereon. The transmitted component is a projection component of the incident polarized light on the transmissive axis, while the absorbed component is a projection component of the incident polarized light on the absorbing axis. Consequently, if the incident polarized light is linearly polarized, it can be completely absorbed by setting the absorbing axis of the polarizer parallelly to the electric vector of the linearly polarized light. In this way it is possible to form the dark state, where the transmittance is low. The polarized state can be expressed by the X axis component Ex and the Y axis component Ey of the electric field vector and the phase difference $\delta$ therebetween. The linearly polarized light is a polarized state, where $\delta=0$. In the step, where light is transmitted by the incident polarizer 15b in FIG. 2, the transmitted light is linearly polarized. In order that it reaches the exit polarizer as it is, it is sufficient to adjust $\Delta n_{LC} \cdot d_{LC}$, which is the sum of optical anisotropies of the nematic liquid crystal layer and the optical anisotropic layer, to 0. That is, it is so adjusted that the apparent $\Delta ni.di$ and the apparent $\Delta n_{LC} \cdot d_{LC}$ are equal to each other. Between them, the apparent $\Delta ni.di$ is constant regardless of the driving voltage. On the contrary, since the alignment state of the nematic liquid crystal layer varies together with the driving voltage, the apparent $\Delta n_{LC} \cdot d_{LC}$ varies also, depending on the driving voltage. That is, below the threshold voltage Vth, where the molecular axis of liquid crystal molecules is aligned approximately parallelly to the surface of the substrate, the apparent $\Delta n_{LC} \cdot d_{LC}$ is equal to the product of the birefringence $\Delta n_{LC}$ of the nematic liquid crystal by the thickness $d_{LC}$ of the nematic liquid crystal layer. When the driving voltage exceeds the threshold voltage Vth and the liquid crystal molecules begin to rise, the apparent $\Delta n_{LC} \cdot d_{LC}$ decreases. In the majority of prior art super twisted nematic type liquid crystal display devices, $\Delta n_{LC} \cdot d_{LC}$ was set so as to be equal to $\Delta n_i \cdot d_i$. For this reason the apparent $\Delta ni.di$ and the apparent $\Delta n_{LC} \cdot d_{LC}$ were equal to each other at a voltage below the threshold voltage Vth. As the result, for the majority of prior art super twisted nematic type liquid crystal display devices, only a dependency of the transmittance on the driving voltage such that the transmittance was smallest at a voltage below the threshold voltage Vth was obtained. According to the present invention $\Delta n_i \cdot d_i$ is set so as to be smaller than $\Delta n_{LC} \cdot d_{LC}$. In this way, the voltage, at which the apparent $\Delta n_i \cdot d_i$ is equal to the apparent $\Delta n_{LC} \cdot d_{LC}$, moves towards the side of the voltage higher than the threshold voltage Vth, where the apparent $\Delta n_{LC} \cdot d_{LC}$ decreases. It is preferable particularly that a condition $$0.25 \leq (\Delta n_i \cdot d_i)/(\Delta n_{LC} \cdot d_{LC}) \leq 0.75$$

is fulfilled.

Here the numerical values 0.25 and 0.75 defining the region of $(\Delta n_i \cdot d_i)/(\Delta n_{LC} \cdot d_{LC})$ are based on a following ground. The alignment state of the nematic liquid crystal layer varies significantly more largely above the threshold voltage Vth than below the threshold voltage Vth. The molecular axis is aligned approximately parallelly to the surface of the substrate in the liquid crystal layer only in the proximity of a polymer layer for aligning of liquid crystal layer and the molecular axis of liquid crystal molecules in the central portion in the thickness direction of the liquid crystal cell is aligned perpendicularly to the surface of the substrate. It is only the former that contributes to the apparent $\Delta n_{LC} \cdot d_{LC}$. Since the latter is optically isotropic, viewed in the direction normal to the surface of the substrate, it contributes nothing to the apparent $\Delta n_{LC} \cdot d_{LC}$. The thickness of the liquid crystal layer, where the molecular axis is aligned approximately parallelly to the surface of the substrate in the proximity of the polymer layer for aligning of liquid crystal layer, is greater than about 0.25 and smaller than about 0.75 of the whole thickness of the nematic liquid crystal layer. Consequently it is desirable to set $\Delta n_i \cdot d_i$ so as to be greater than 0.25 and smaller than 0.75 of $\Delta n_{LC} \cdot d_{LC}$.

In the above explanation, it has been made, as if there were only one optical anisotropic layer. In the case where there are a plurality of optical anisotropic layers, $\Delta n_i \cdot d_i$ described above may be replaced by a sum of $\Delta n_i \cdot d_i$ of the different optical anisotropic layers. That is, denoting the number of the optical anisotropic layers by m (m≧1), $\Delta ni.di$ described above may be replaced by $$\sum_{i=1}^{m} \Delta n_i \cdot d_i$$

This is true also in the following explanation.

Now the item (ii) will be explained. It is supposed that the phase difference $\delta$ of the transmitted light incident on the exit polarizer by the way described previously for $V_1$ of the two-valued driving voltages $V_1$ and $V_2$ is 0 so that a dark state is displayed. It is the phase difference $\delta$ of the transmitted light for $V_2$ that determines the transmittance of the exit polarizer for the transmitted light at $V_2$ in this case. The ratio of the component transmitted by the exist polarizer is determined by a geometrical drawing as indicated in FIG. 26. What is important here is the shape of electric vector and it is the phase difference of the transmitted light that determines it. Since the phase difference $\delta$ is 0 for $V_1$, the phase difference $\delta$ for $V_2$ is determined by an amount of variation $\Delta$ of the phase difference between $V_1$ and $V_2$. As the amount of variation $\Delta$ in the phase difference increases to become closer to $\pi$, the transmitted component of the transmitted light for $V_2$ increases. In order to find the solution for the program for increasing the amount of variation $\Delta$ in the phase difference between the two-valued driving voltages $V_1$ and $V_2$, the inventors of the present invention have considered a uniaxial crystal model as indicated in FIG. 27. This is a model, in which the nematic liquid crystal layer used for the super twisted nematic type liquid crystal display device is simplified and concretely speaking, the twisted structure thereof is neglected. It is supposed that the change of alignment in the nematic liquid crystal takes place so that the angle $\theta$ formed by the molecular axis of liquid crystal molecules with the surface of the substrate varies uniformly. The apparent $\Delta n_{LC} \cdot d_{LC}$ at this time is given by Eq. [4];

$$\Delta n_{LC} \cdot d_{LC} = (n_\theta - n_\perp) \cdot d_{LC} \quad [4]$$

where $n_\theta$ represents the refractive index of the fast axis of the nematic liquid crystal layer, when the angle formed by the molecular axis of liquid crystal molecules with the surface of the substrate is $\theta$; $n_\perp$ the refractive index in the direction perpendicular to the molecular axis of liquid crystal molecules; and $d_{LC}$ the thickness of the nematic liquid crystal layer $n_\theta$ is given by Eq. [5];

$$n_\theta = n_1 n_\perp / \sqrt{(n_1^2 \sin^2\theta + n_\perp^2 \cos^2\theta)} \quad [5]$$

where $n_1$ represents the refractive index in the direction of the molecular axis of liquid crystal molecules. The phase difference given to the transmitted light at this time is given by Eq. [6];

$$\delta = 2\pi (n_\theta - n_\perp) d/\lambda \quad [6]$$

where λ represents the wavelength of the transmitted light. The amount of variation Δ in the phase difference, which is the question, is proportional to the rate of variations in the phase difference accompanied by variations in θ. This is namely $\partial\delta/\partial\theta$. $\partial\delta/\partial\theta$ is expressed by Eq. [7];

$$\partial\delta/\partial\theta = \Delta n d\pi \, n_\theta^3 (n_1 + n_\perp) \sin 2\theta / n_1^2 n_\perp^2 \lambda \quad [7]$$

As clearly seen from Eq. [7], the amount of variations Δ in the phase difference is proportional to Δnd in Eq. [7]. That is, it can be obtained for the solution for the program for increasing the amount of variations Δ in the phase difference that it is sufficient to increase $\Delta n_{LC} \cdot d_{LC}$ of the nematic liquid crystal layer.

Now, quantitatively, in what degree should $\Delta n_{LC} \cdot d_{LC}$ be increased? In order to evaluate it, the inventors of the present invention have adopted a method for quantitatively determining the amount of variations in the phase difference experimentally, using Stokes' parameters.

The Stokes' parameters represent the polarized state of polarized light and are defined as given by Eqs. [8], [9] and [10], respectively, using the X axis component $E_X$ and the Y axis component $E_Y$ of the electric field vector of the polarized light and the phase difference δ therebetween;

$$S_1 = (E_X^2 - E_Y^2)/(E_X^2 + E_Y^2) \quad [8]$$

$$S_2 = 2 E_X E_Y \cos \delta / (E_X^2 + E_Y^2) \quad [9]$$

$$S_3 = 2 E_X E_Y \sin \delta / (E_X^2 + E_Y^2) \quad [10]$$

Denoting the polarized state of the transmitted light incident on the exit polarizer for the driving voltage $V_1$ by ($S_1$, $S_2$, $S_3$) and the polarized state of the transmitted light incident on the exit polarizer for the driving voltage $V_2$ by ($S_1'$, $S_2'$, $S_3'$), the amount of variations $\Delta E_X$ in the phase difference obtained experimentally is expressed by Eq. [11];

$$\Delta_{EX} = 0.5(1 - S_1 S_1' - S_2 S_2' - S_3 S_3') \pi \ldots [11]$$

Figure 28A:
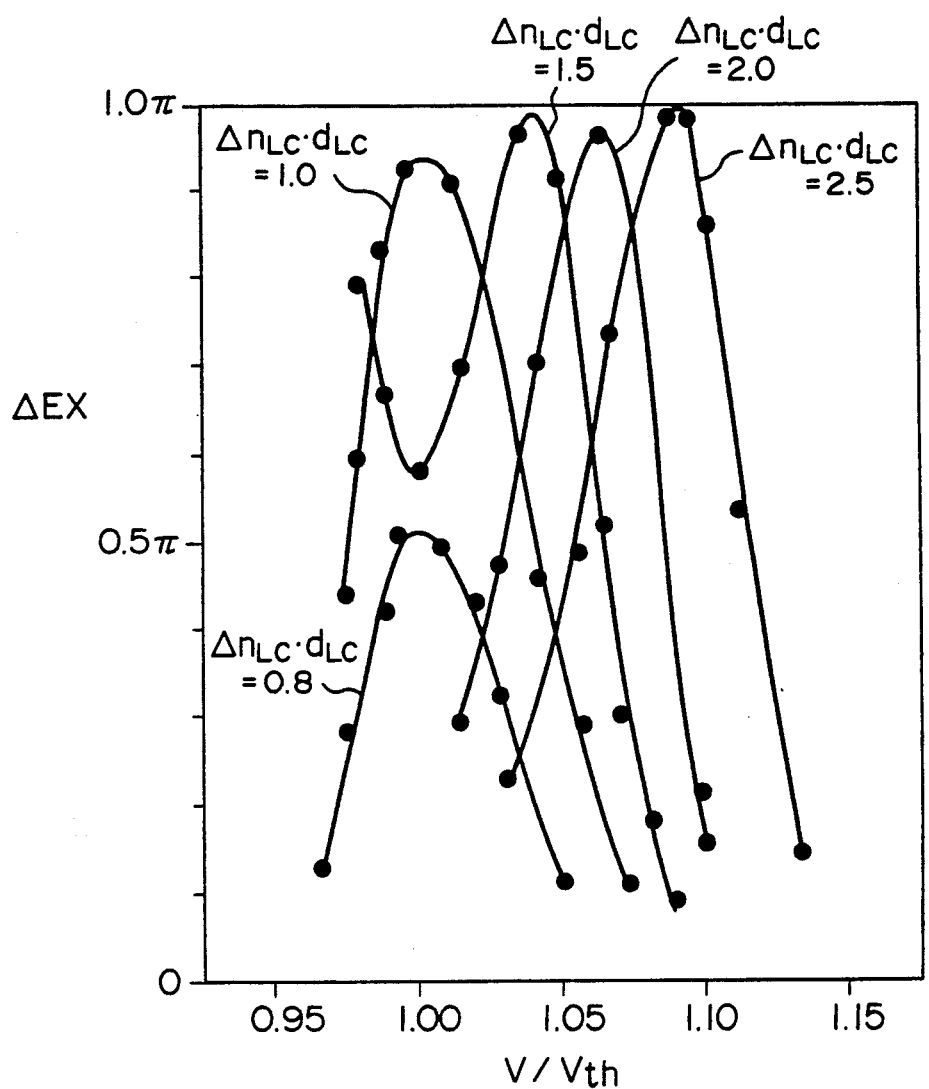
FIG. 28A is a graph showing a relation between changes in the phase difference and $\Delta n_{LC} \cdot d_{LC}$, which is the product of the birefringence $\Delta n_{LC}$ by the layer thickness $d_{LC}$ of a nematic liquid crystal layer of the super twisted nematic type liquid crystal display device.
Figure 28B:
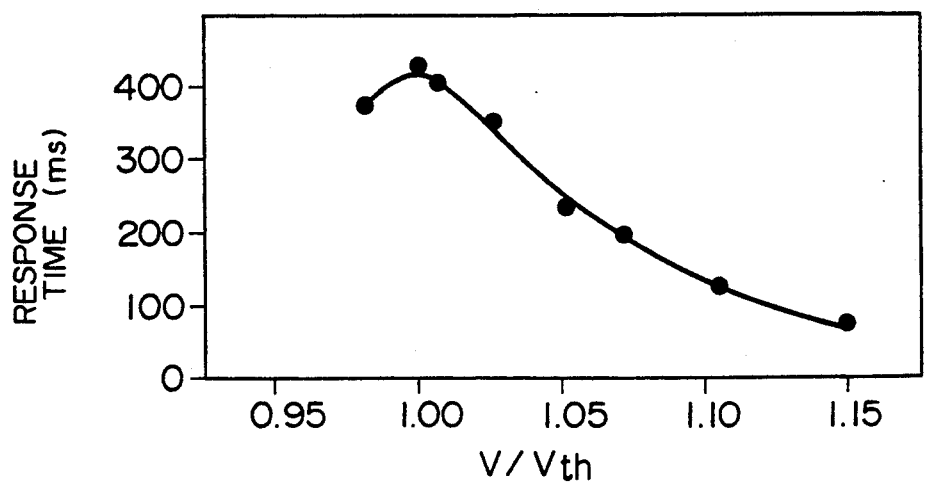
FIG. 28B is a graph showing a relation between the response time and the driving voltage of the super twisted nematic type liquid crystal display device.
Figure 29:
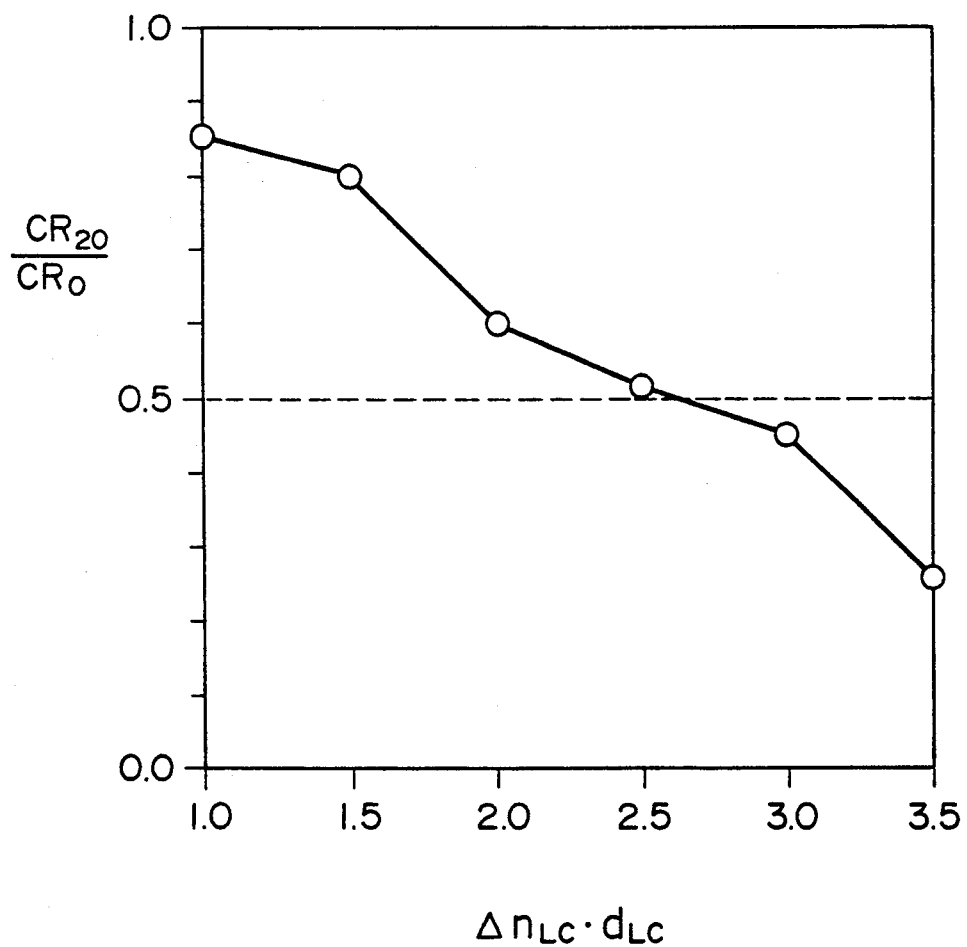
FIG. 29 is a graph showing a relation between $\Delta n_L \cdot d_{LC}$ and the viewing angle performance of the display quality of the super twisted nematic type liquid crystal device.

FIG. 28A shows a measured dependency of $\Delta_{EX}$ described above on $\Delta n_{LC} \cdot d_{LC}$. The abscissa in FIG. 28A represents the driving voltage V normalized by the threshold voltage Vth. Hereinbelow this is called the normalized voltage. In the prior art super twisted nematic type liquid crystal display device, $\Delta n_{LC}$ is about 0.13; $d_{LC}$ is about 6 μm; and the value of $\Delta n_{LC} \cdot d_{LC}$ described above is about 0.8 μm. FIG. 28A shows the dependency of $\Delta_{EX}$ on the normalized voltage for $\Delta n_{LC} \cdot d_{LC} = 0.8$ μm $\Delta_{EX}$ takes the maximum value 0.5 π for the threshold voltage Vth and decreases rapidly on the side of the voltage higher than it. It was recognized that in the prior art super twisted nematic type liquid crystal display device, it is because the amount of variations in the phase difference decreases that the variations in the transmittance are slow on the side of the voltage higher than the threshold voltage Vth. Further, in order to obtain a display quality, which is as good as or better than that obtained by the prior art super twisted nematic type liquid crystal display device, it was found that $\Delta_{EX}$ should be as great as greater than 0.5 π. The dependency of $\Delta_{EX}$ on the normalized voltage is indicated in FIG. 28A also for $\Delta n_{LC} \cdot d_{LC}$ of 1.0 μm, 1.5 μm, 2.0 μm, and 2.5 μm. $\Delta E_X$ increases with increasing $\Delta n_{LC} \cdot d_{LC}$ and the region, where $\Delta E_X$ is greater than 0.5 π, is extended also on the higher voltage side. When $\Delta n_{LC} \cdot d_{LC}$ is 1.0 μm, the region, where $\Delta_{EX}$ is greater than 0.5 π, reaches the driving voltage region indicated in FIG. 28B, where the response time is shorter than about 0.75 time as long as the maximum response time obtained for the threshold voltage Vth. In this driving voltage region the response time is shorter than 300 ms and pointer display, etc. are possible. Consequently, concretely speaking, $\Delta n_{LC} \cdot d_{LC}$ may be greater than 1.0 μm. The viewing angle performance in the display is one of the important characteristics for evaluating the performance of the super twisted nematic type liquid crystal display device, although it has not been indicated till now. FIG. 29 shows the dependency of the viewing angle performance in the display quality on $\Delta n_{LC} \cdot d_{LC}$. The ordinate in FIG. 29 represents $CR_{20}/CR_0$, which is a ratio of the contrast ratio $CR_{20}$ observed in a direction inclined by 20° measured from the direction normal to the surface of the substrate to the contrast ratio $CR_0$ observed in the direction normal to the surface of the substrate. $CR_{20}/CR_0$ decreases with increasing $\Delta n_{LC} \cdot d_{LC}$. Taking variations in the viewing angle of a user into account, in order that it can be used as a straight looking type display device, it is not preferable that $CR_{20}$ decreases to a value below a half of $CR_0$. Consequently it is desirable that $\Delta n_{LC} \cdot d_{LC}$ is small than 2.5 μm. Therefore, combined with experimental results described previously, it is preferable that $\Delta n_{LC} \cdot d_{LC}$ is greater than 1.0 μm and smaller than 2.5 μm as a concrete region therefor.

In order to increase $\Delta n_{LC} \cdot d_{LC}$ from the conventional value to the region described above, there are two methods, i.e. the one is increase of $\Delta n_{LC}$ of the nematic liquid crystal material the other is increase of the thickness d of the nematic liquid crystal layer. However the latter is not preferable, because it lowers the strength of electric field within the liquid crystal cell and gives rise to increase in the response time. Consequently it is desirable to increase $\Delta n_{LC}$ of the nematic liquid crystal material. Concretely speaking, $\Delta n_{LC}$ of the nematic liquid crystal material may be greater than 0.2 in order to obtain the value of $\Delta n_{LC} \cdot d_{LC}$ described above for a thickness $d_{LC}$ of 5 μm of the nematic liquid crystal layer, which is the lower limit thereof for a super twisted nematic type liquid crystal display device, for which mass production is possible by the present state of techniques. Further $\Delta n_{LC}$ of the nematic liquid crystal material is in a trade-off relation with other necessary conditions such as temperature region of liquid crystal, coefficient of viscosity, threshold voltage, bend/spray elastic constant ratio, etc. Therefore it is not desirable to increase it excessively If $\Delta n_{LC}$ is smaller than 0.3, it is possible to achieve all the characteristics necessary for the nematic liquid crystal material at the lowest allowable level. Consequently it is desirable that $\Delta n_{LC}$ is smaller than 0.3. Combined with the previous description, it is preferable that $\Delta n_{LC}$ of the nematic liquid crystal material is greater than 0.2 and smaller than 0.3.

Further, in the case where $\Delta n_{LC} \cdot d_{LC}$ is greater than 1 m and smaller than 2.5 μm, in order to have $(\Delta n_i \cdot d_i)/(\Delta n_{LC} \cdot d_{LC})$ greater than 0.25 and smaller than 0.75, it is preferable that $(\Delta n_{LC} \cdot d_{LC}) - (\Delta n_i \cdot d_i)$ is greater than 0.25 μm and smaller than 1.88 μm.

Figure 22A:
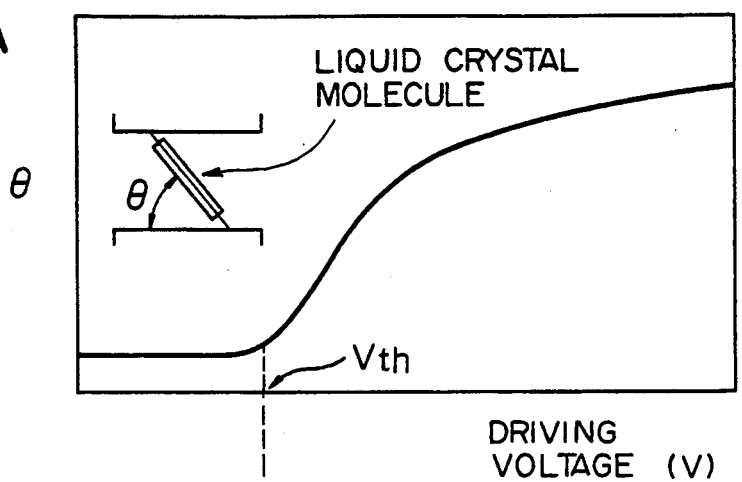
FIG. 22A is a graph showing a relation between the alignment of liquid crystal molecules and the driving voltage of a prior art super twisted nematic type liquid crystal display device and one fabricated according to the present invention.

It is possible to realize the dependency of the transmittance on the driving voltage indicated by a full line and a broken line in FIG. 30 by setting the respective values as described above. The scale of the abscissa in FIG. 30 is the same as that used in FIGS. 22A, 22B and 22C. As it can be seen from FIG. 30, according to the present invention, it is possible to obtain a satisfactory contrast ratio and brightness in a high voltage region, where the response time is shortened. That is, according to the present invention, the response time and the display quality can be compatible, which was impossible for the prior art super twisted nematic type liquid crystal display device.

In the case where the twist angle of the nematic liquid crystal layer is greater than 180° and smaller than 300°, variations in the alignment of liquid crystal molecules show an abrupt dependency on the driving voltage. For the purpose of obtaining a super twisted nematic type liquid crystal display device capable of being driven by the multiplex driving method, it is preferable particularly to set the twist angle so as to be smaller than 180° and greater than 300°.

The method described above is desirable for obtaining a super twisted nematic type liquid crystal display device provided with matrix electrode which can display fine large volumed image, in spite of having a simple construction with respect to a TFT type liquid crystal display device.

Figure 22B:
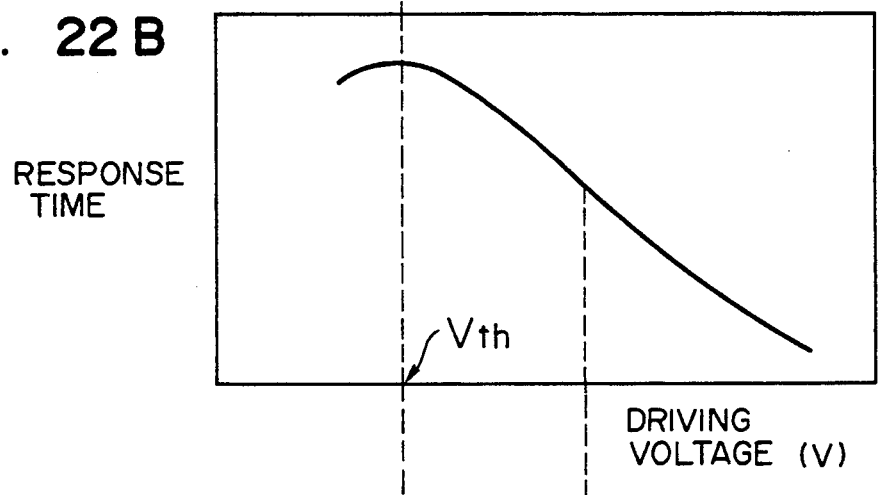
FIG. 22B is a graph showing a relation between the response time and the driving voltage of a prior art super twisted nematic type liquid crystal display device and one fabricated according to the present invention.
Figure 22C:
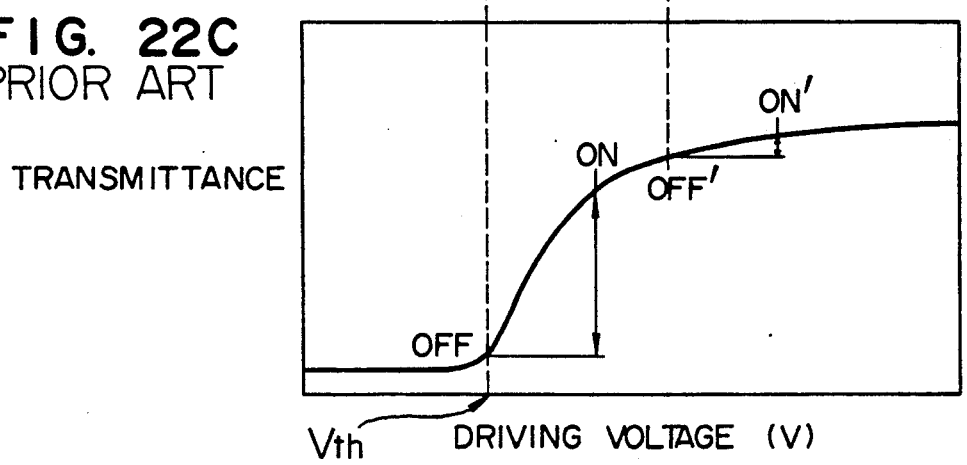
FIG. 22C is a graph showing a relation between the transmittance and the driving voltage of a prior art super twisted nematic type liquid crystal display device.
Figure 23:
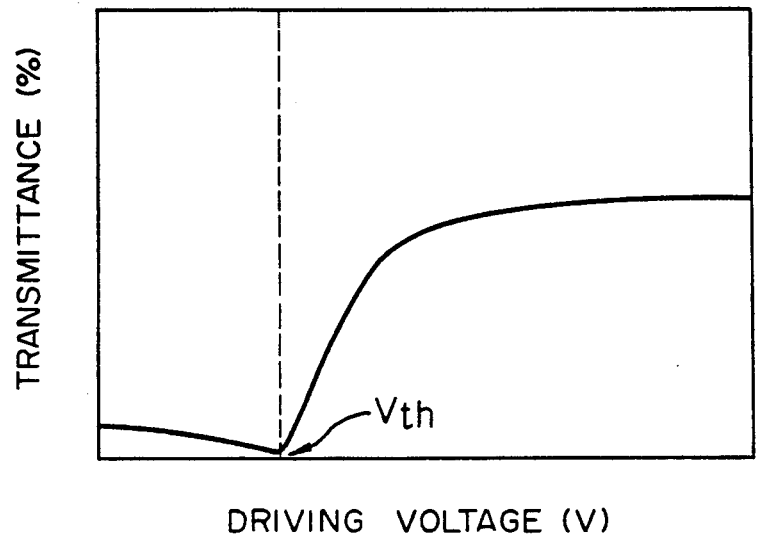
FIG. 23 is a graph showing a relation between the transmittance and the driving voltage of another prior art super twisted nematic type liquid crystal display device.
Figure 24:
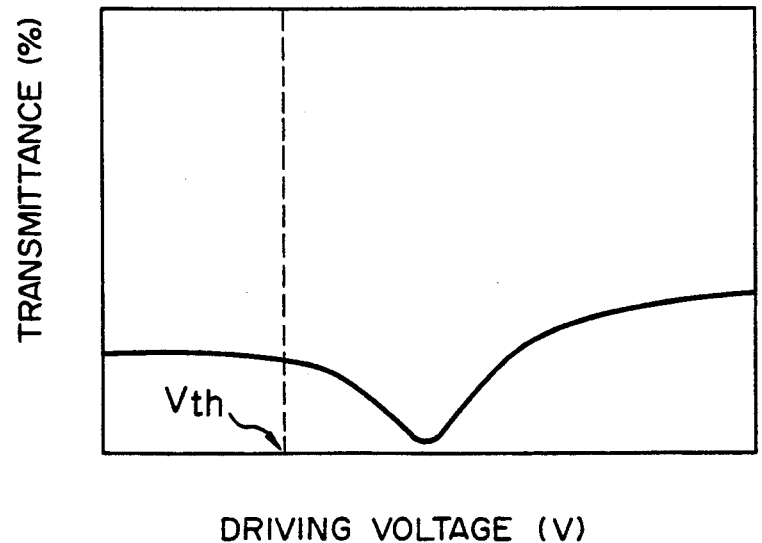
FIG. 24 is a graph showing a relation between the transmittance and the driving voltage of still another prior art super twisted nematic type liquid crystal display device.
Figure 25:
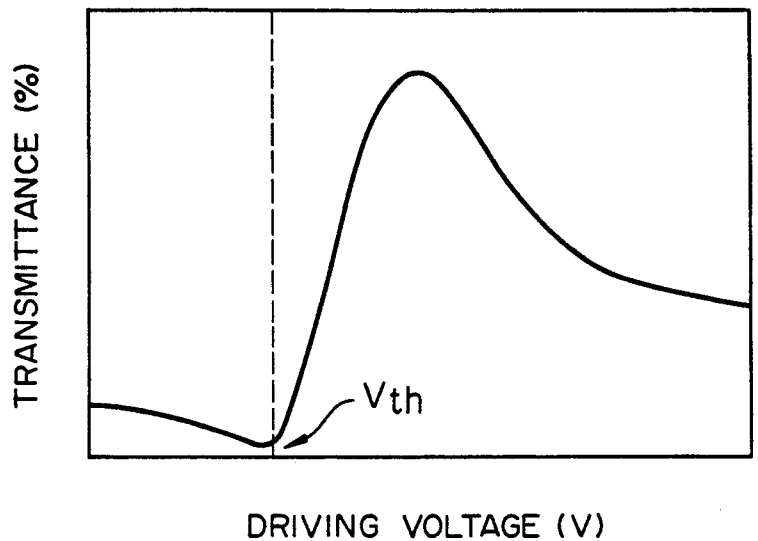
FIG. 25 is a graph showing a relation between the transmittance and the driving voltage of still another prior art super twisted nematic type liquid crystal display device.

As indicated in FIG. 22B, the response time of the super twisted nematic type liquid crystal display device is shortened on the side of the voltage higher than the threshold voltage. In order to drive the liquid crystal display device on the side of the voltage higher than the threshold voltage, it may have the dependency of the transmittance on the driving voltage as indicated by the full or the broken line in FIG. 30. Concretely speaking, if the transmittance is smaller than 2% for the applied voltage $V_1$, which is on the side of the voltage higher than the threshold voltage Vth defined by Eq. [2], the dark state seems to human eyes to be sufficiently dark and a display having a high viewing performance can be obtained. If the transmittance is greater than 12% for the applied voltage $V_2$, which is on the side of the voltage higher than the threshold voltage defined by Eq. [2], a satisfactory superficial brightness is obtained and a display having a high viewing performance can be obtained. Furthermore, if the driving voltages $V_1$ and $V_2$ described above are in a relation given by Eq. [3], a large capacity having more than 50 scanning lines will be possible in the super twisted nematic type liquid crystal display device, using the multiplex driving, is possible. This is obvious from the relation between the ratio of $V_1$ to $V_2$ defined by Eq. [1] and the number of scanning lines N.

In the liquid crystal display device described above, the response time is shortened, if it is driven on the side of the voltage higher than the threshold voltage Vth defined by Eq. [2]. For this reason, in the case where the liquid crystal display device described above is driven, when voltages having more than 2 values are applied to the liquid crystal cell, it is preferable that the lowest voltage among them is higher than the threshold voltage Vth defined by Eq. [2].

In order to realize the dependency of the transmittance on the driving voltage, as indicated in FIG. 30, it is preferable that the phase difference δ of the transmitted light incident on the exit polarizer on the side of the voltage higher than the threshold voltage is brought closer to 0. On the side of the voltage higher than the threshold voltage Vth, the molecular axis only in the part of the liquid crystal layer in the proximity of the polymer layer for aligning of liquid crystal layer is aligned approximately parallelly to the surface of the substrate and the molecular axis of liquid crystal molecules at the central portion in the thickness direction of the liquid crystal cell is aligned perpendicularly to the surface of the substrate. It is thought that optical characteristics of the nematic layer in such a state are identical to those shown by a 2-layered optical anisotropic body disposed so that the fast axis is directed in the alignment direction. In order to make the nematic liquid crystal layer in such a state apparently isotropic, using an optical anisotropic layer, it is preferable to set the fast axis so that it is inclined with an angle greater than 60° and smaller than 90°. If the optical characteristics shown by the nematic liquid crystal layer, to which a voltage higher than the threshold voltage Vth is applied, are strictly identical to the optical characteristics shown by the 2-layered anisotropic body disposed so that the fast axis is directed in the alignment direction, the angle formed by the fast axis of the optical anisotropic body and the alignment direction may be 90°. However, in practice, there remains somewhat twisted structure in the alignment of the nematic liquid crystal layer. For the purpose of taking also influences thereof into account, it is preferable to set the angle formed by the fast axis of the optical anisotropic body and the alignment direction in the region described above. In the same way, if the optical characteristics shown by the nematic liquid crystal layer, to which a voltage higher than the threshold voltage Vth is applied, are strictly identical to the optical characteristics shown by the 2-layered anisotropic body disposed so that the fast axis is directed in the alignment direction, the angle formed by the absorbing axes of the polarizers disposed above and below may be 90°. However, for a similar reason, it is preferable to set this angle in a region from 60° to 90°.

For example a polycarbonate film, a polyvinylalcohol film, a polystyrene film, a polyester film, which are uniaxially stretched, may be used for the optical anisotropic layer.

In the present specification a term "fast axis" has been used often. This is one having a greater refractive index between two electro-optical main axes parallel to a plane, which a plane-shaped optical anisotropic layer.

In the liquid crystal display device described above, in the case where a matrix electrode is formed by combining electrodes formed so as to be stripe-shaped, regions, to which no voltage is applied, are formed on the substrate in a lattice shape. In the liquid crystal display device according to the present invention, as indicated by the dependency of the transmittance on the driving voltage in FIG. 30, the transmittance is not 0 in a state where the applied voltage is 0. For this reason, light leaks through the regions, to which no voltage is applied, and in the case where the display portion is regarded as a whole, the dark state is not satisfactorily dark. Therefore it has a tendency that the contrast ratio is somewhat lowered. In order to increase further the contrast ratio of the liquid crystal display device according to the present invention, it is preferable to use one provided with absorbing layers on the parts, where there exist no electrodes on the substrates. For example, metals such as Cr, Cu, Mn, Mo, Al, etc. are suitable as material for the absorbing layers. Further it is preferable to dispose insulating layers between the absorbing layers and the electrodes. $SiO_2$ and SiO are suitable as material for the insulating layers.

$\Delta n_{LC}$ of the nematic liquid crystal material is in a trade-off relation with other necessary conditions such as temperature region of liquid crystal, coefficient of viscosity, threshold voltage, bend/spray elastic constant ratio, etc. In particular, increase in the coefficient of viscosity accompanied by the increase in $\Delta n_{LC}$ leads in general to increase in the response time. As a liquid crystal material having a high $\Delta n_{LC}$ and a low coefficient of viscosity there are known e.g. torans (R—C$_6$H$_4$—C≡C—C$_6$H$_4$—R'), which are suitable as the liquid crystal material for the liquid crystal display device according to the present invention.

If the time for lightening a pointer is shorter than the time for extinguishing it, the pointer hardly disappears, even if the speed of movement of the pointer on a displayed image is increased. Here the pointer is a kind of display on the displayed image, which moves on the displayed image according to displacement of a pointing device. Usually a pointer is a mark such as an arrow. Since there is a tendency that the rise time $T_R$ is shorter than the fall time $T_F$ on the side of the voltage higher than the threshold voltage, the display condition may be set so that the time required for lightening the pointer is equal to $T_R$. Concretely speaking, it is desirable that the pointer is displayed in the dark state, if normally open, while it is displayed in the bright state, if normally closed. "Normally open" means that, in the case where display is effected in the bright state and in the dark state by applying two voltages $V_1$ and $V_2$ (Supposing that $V_2 > V_1$) to the liquid crystal cell, the dark state is displayed by $V_2$, while the bright state is displayed by $V_1$. On the other hand, "normally closed" means that the bright state is displayed by $V_2$, while the dark state is displayed by $V_1$.

At using the liquid crystal display device according to the present invention, the two voltages $V_1$ and $V_2$, which are on the side of the voltage higher than the threshold voltage Vth defined by Eq. [2], are applied to the liquid crystal cell. If the values of the Stokes' parameters ($S_1$, $S_2$, $S_3$) representing the polarized state of the transmitted light incident on the exit polarizer at the application of $V_1$ and the values of the Stokes' parameters ($S_1'$, $S_2'$, $S_3'$) representing the polarized state of the transmitted light incident on the exit polarizer at the application of $V_2$ are in a relation given by Eq. [12], it is possible to obtain a display quality, which is equal or better than that obtained by the prior art super twisted nematic type liquid crystal display device;

$$0.5 \leq 0.5 (1 - S_1 S_1' - S_2 S_2' - S_3 S_3') \quad [12]$$

The liquid crystal display device described above used in a word processor or a lap-top type computer is provided with an applied voltage shifting mechanism, by means of which a user can arbitrarily set the applied voltage according to the variation in the threshold voltage accompanied by temperature variations. Usual variations in the room temperature in a year is about from 0° to 40° C. Contrarily thereto, the half width of the contrast ratio-applied voltage curve of the liquid crystal display device according to the present invention is sufficiently wide to cover variations in the threshold voltage due to the temperature variations described above.

Hereinbelow some embodiments of the present invention and examples for comparison therefor will be explained concretely.

[EMBODIMENT 1]

Figure 1:
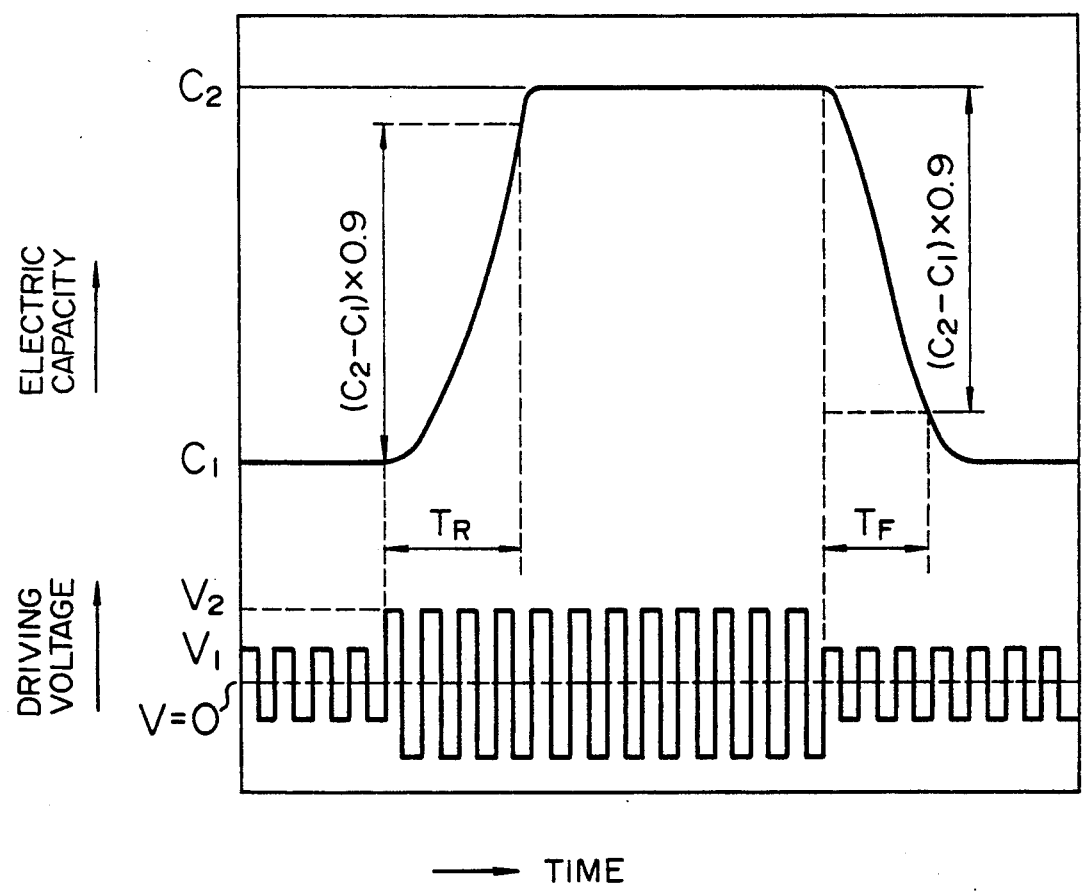
FIG. 1 is a diagram indicating the definition of the response time.
Figure 2:
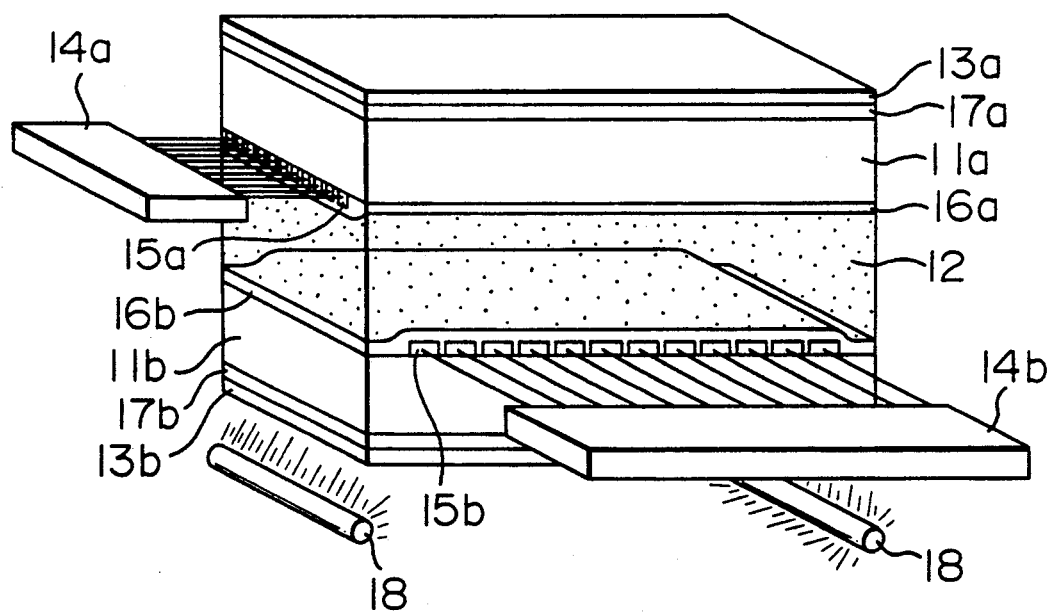
FIG. 2 is a schematical perspective view showing a liquid crystal display device according to an embodiment of the present invention.

FIG. 2 shows the construction of the liquid crystal display device according to an embodiment of the present invention, in which reference numeral 11a is an exit substrate; 11b is an incident polarizer; 12 is a nematic liquid crystal layer put between the two substrates 11a and 11b; 13a is an exit polarizer; 13b is an incident polarizer; 14a and 14b are respective driving sections; 15a and 15b are electrodes disposed on the exit substrate 11a and the incident substrate 11b, respectively, formed in a stripe-shape, having an electrode width of 0.25 mm and an electrode interval of 0.01 mm, and made of ITO film; 16a is an exit polymer layer for aligning of liquid crystal layer; 16b is an incident polymer layer for aligning of liquid crystal layer; and 18 is a light source. The polymer layers for aligning of liquid crystal layer 16a and 16b are made of polyimide polymer, on which varnish LQ 1800 (produced by Hitachi Kasei Ltd. Co.) was applied by the spin coat method, and they were finished by hardening it at 250° C. in 1 hr. The film thickness is 70 mm. The film thus obtained was subjected to alignment processing under a condition of 400 rpm and a forwarding speed of 10 cm/min with a pretilt angle of 4°. These two substrates were put, opposite to each other with a twist angle of 240°, and adhered by using a sealing agent, in which a spacer agent (fabricated by Sekisui Fine Chemical Ltd. Co.) is mixed, to form a liquid crystal cell having a substrate interval ($d_{LS}$) of 6.5 $\mu$m. The stripe-shaped electrodes 15a and 15b were formed so as to constitute XY (matrix) electrodes by being put opposite to each other.

The nematic liquid crystal layer 12 is composed by mixture of liquid crystal material DOP-70710-2 (fabricated by Rodic Ltd. Co.) and chiral dopant S-811 (fabricated by Merck & Co. Ltd.) Birefringence of DOP-70710-2 is 0.22 and mixing ratio of chiral dopant is 0.9 weight percent. This was sealed in the liquid crystal cell described above to obtain a super twisted nematic type liquid crystal. The dependency of the electric capacitance on the driving voltage of the liquid crystal cell thus obtained was measured by applying an AC voltage of 1 kHz to the liquid crystal cell to stud the (electric capacitance-driving voltage) curve (corresponding to FIG. 21) and Va=2.4 V, Ca=98.4 $\mu$F and Co=77.1 $\mu$F and $\alpha$=220 $\mu$F/V were obtained. Here Va, Ca, Co and $\alpha$ are same as stated previously. Starting therefrom the threshold voltage (Vth) was obtained, using Eq. [2] and Vth=2.30 V was found.

In FIG. 2, 17a is an exit optical anisotropic layer and 17b is an incident optical anisotropic layer. The exit optical anisotropic layer has a birefringence $\Delta n_1$ of 0.0041 and a thickness $d_1$ of 110 $\mu$m, thus $\Delta n_1 \cdot d_1$=450 nm, while the incident optical anisotropic layer has a birefringence $\Delta n_2$ of 0.0048 and a thickness $d_2$ of 115 $\mu$m, thus $\Delta n_2 \cdot d_2$=550 nm. Further phase plates (fabricated by Nitto Denko Ltd. Co.) made of polycarbonate film were used for the optical anisotropic layers 17a and 17b.

Putting together the optical setting conditions described above, ($\Delta n_{LC} \cdot d_{LC}$)=1.43 $\mu$m, ($\Delta n_1 \cdot d_1 + \Delta n_2 \cdot d_2$)/($\Delta n_{LC} \cdot d_{LC}$)=0.70 and $\Delta n_{LC}$ of the liquid crystal material=0.22 are found.

Figure 3:
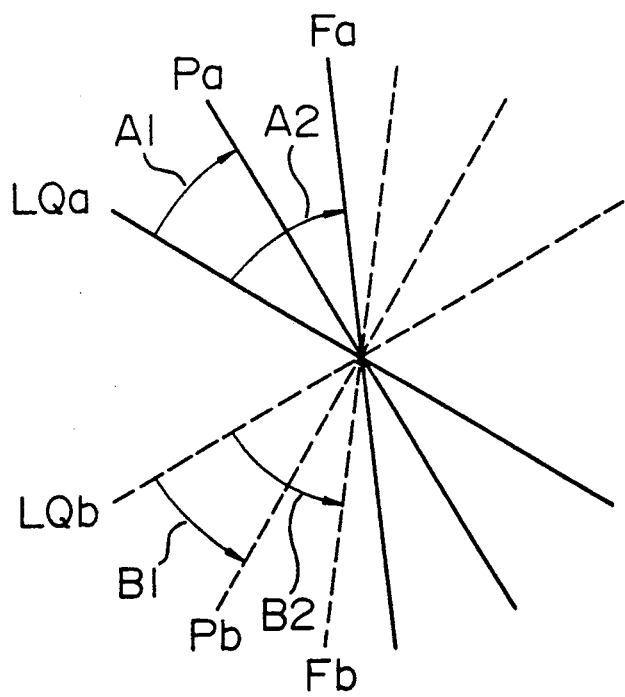
FIG. 3 is a diagram indicating a positional relation of various members constituting the liquid crystal display device.

FIG. 3 is a diagram indicating a positional relation of the different members, when the liquid crystal display device indicated in FIG. 2 is viewed in the direction normal to the surface of the substrate, putting the exit substrate closer to the observer. That is, FIG. 3 defines the arrangement angles among the alignment direction LQa of the exit polymer layer for aligning of liquid crystal layer 16a; the alignment direction LQb of the incident polymer layer for aligning of liquid crystal layer 16b, the absorbing axis Pa of the exit polarizer 13a, the absorbing axis Pb of the incident polarizer 13b, the fast axis of the exit optical anisotropic layer 17a, and the fast axis Fb of the incident optical anisotropic layer 17b. As indicated in FIG. 3, the angle formed by the alignment direction LQa of the exit polymer layer for aligning of liquid crystal layer 16a and the absorbing axis of the exit polarizer 13a is denoted by A1; the angle formed by the alignment direction LQa of the exit polymer layer for aligning of liquid crystal layer 16a and the fast axis Fa of the exit optical anisotropic layer 17a by A2; the angle formed by the alignment direction LQb of the incident polymer layer for aligning of liquid crystal layer 16b and the absorbing axis Pb of the incident polarizer 13b by B1; and the angle formed by the alignment direction LQb of the incident polymer layer for aligning of liquid crystal layer 16b and the fast axis Fb of the incident optical anisotropic layer 17A by B2.

In the present embodiment these angles were set as follows; A1=84°, A2=58°, B1=93° and B2=36°. At this time the angle formed by the absorbing axes Pa and Pb of the two polarizers 13a and 13b is 57°. Further, in the present embodiment, the angle formed by LQa and LQb is the twist angle described previously and this twist angle is 240°.

Figure 4:
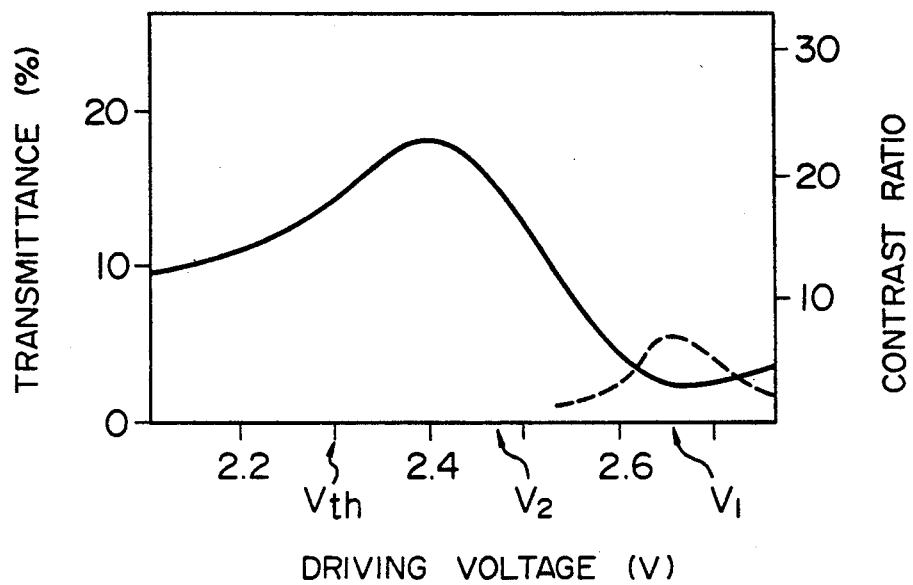
FIG. 4 is graphs showing relations between the transmittance as well as the contrast ratio and the driving voltage of the liquid crystal display device according to an embodiment of the present invention.

The dependency of the transmittance on the driving voltage of the liquid crystal display device was measured by using an AC electric field of 1 kHz. The measured region was a circle having a diameter of 1 cm, which was selected so as to include an electrode part and a part, where there existed no electrode. A result thus obtained is indicated by a full line in FIG. 4. The maximum value of 18% was obtained at 2.40 V (Vth×1.04), while the minimum value of 2.9% was obtained at 2.66 V (Vth×1.16). Further the dependency of the contrast ratio on the applied voltage of the liquid crystal display device described above was measured by using an AC rectangular wave of 1 kHz under a driving condition that duty ratio is 1/200. A result thus obtained is indicated by a broken line in FIG. 4. For the contrast ratio, the abscissa in FIG. 4 represents the driving voltage of higher value used at driving the display device with under the driving condition that duty ratio is 1/200. The peak value of the contrast ratio was obtained at 2.65 V (Vth×1.15) and it was 6.5.

Further the driving voltage $V_1$ was set at 2.65 V (Vth×1.15), at which the peak of the contrast ratio is obtained. The Stokes' parameters ($S_1$, $S_2$, $S_3$) of the transmitted light incident on the exit polarizer at the application of $V_1$ and $S_1 = -0.55$, $S_2 = 0.88$ and $S_3 = 0.44$ were obtained. Similarly the Stokes' parameters ($S_1'$, $S_2'$, $S_3'$) were measured, the driving voltage $V_2$ being set at 2.43 V (Vth×1.06), and $S_1' = 0.28$, $S_2' = 0.68$ and $S_3' = 0.73$ were obtained. Therefore $0.5 \times (1 - S_1 S_1' - S_2 S_2' - S_3 S_3') = 0.901$. The wavelength of the light used for the measurement was 550 nm, for which the visual sensitivity of a human being is highest.

The response time was measured at 22° C. for $V_1$ and $V_2$ described above and a rise time of $T_R = 90$ ms and a fall time of $T_F = 170$ ms were obtained.

As described above, it was possible to make the response time and the display quality compatible by setting the optical setting conditions of the liquid crystal cell and the optical anisotropic layers, the setting angles for the optical anisotropic layers and the polarizers, the values of the driving voltages $V_1$ and $V_2$, the Stokes' parameters of the transmitted light for $V_1$ and $V_2$ and the dependency of the transmittance on the driving voltage as determined previously.

[EMBODIMENT 2]

The setting angles of the polarizers 13a and 13b used in the liquid crystal display device, in EMBODIMENT 1 were changed. That is, they were set at A1=98° and B1=93°. The angle formed by the absorbing axes Pa and Pb of the two polarizers 13a and 13b were 70°.

Figure 5:
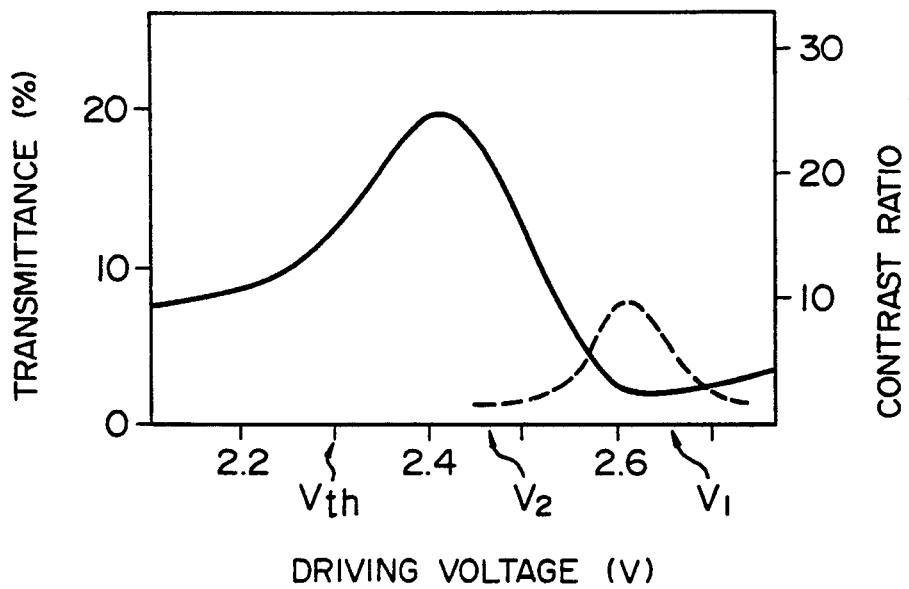
FIG. 5 is graphs showing relations between the transmittance as well as the contrast ratio and the driving voltage of the liquid crystal display device according to another embodiment of the present invention.

An AC voltage of 1 kHz was applied to this liquid crystal display device and the dependency of the transmittance on the applied voltage thereof was measured. A result thus obtained is indicated by a full line in FIG. 5. The minimum value of the transmittance was obtained at 2.62 V (1.14×Vth) and it was 2.2%. On the other hand the maximum value of the transmittance was obtained at 2.41 V (1.05×Vth) and it was 19%.

This liquid crystal display device was driven under the driving condition that duty ratio is 1/200 and the dependency of the contrast ratio thereof was measured. A result thus obtained is indicated by a broken line in FIG. 5. The maximum value of the contrast ratio was obtained at 2.61 V (1.13×Vth) and it was 7.8.

The response time was measured at 22° C., when the liquid crystal display device was driven between $V_1$ and $V_2$, $V_1$ being set at 2.61 V (1.13×Vth), at which the maximum value of the contrast ratio was obtained, $V_2$ being set at 2.43 V (1.06×Vth). A rise time of $T_R = 100$ ms and a fall time of $T_F = 180$ ms were found.

Owing to the fact that the angle formed by the absorbing axes Pa and Pb of the two polarizers 13a and 13b was changed to 70°, as described above, the display in the dark state became darker and the contrast ratio was further increased under the condition that the response time and the display quality are compatible.

[EMBODIMENT 3]

The setting angles of the optical anisotropic layers 17a and 17b used in the liquid crystal display device in EMBODIMENT 1 were changed. That is, they were set at A2=84° and B2=79°.

Figure 6:
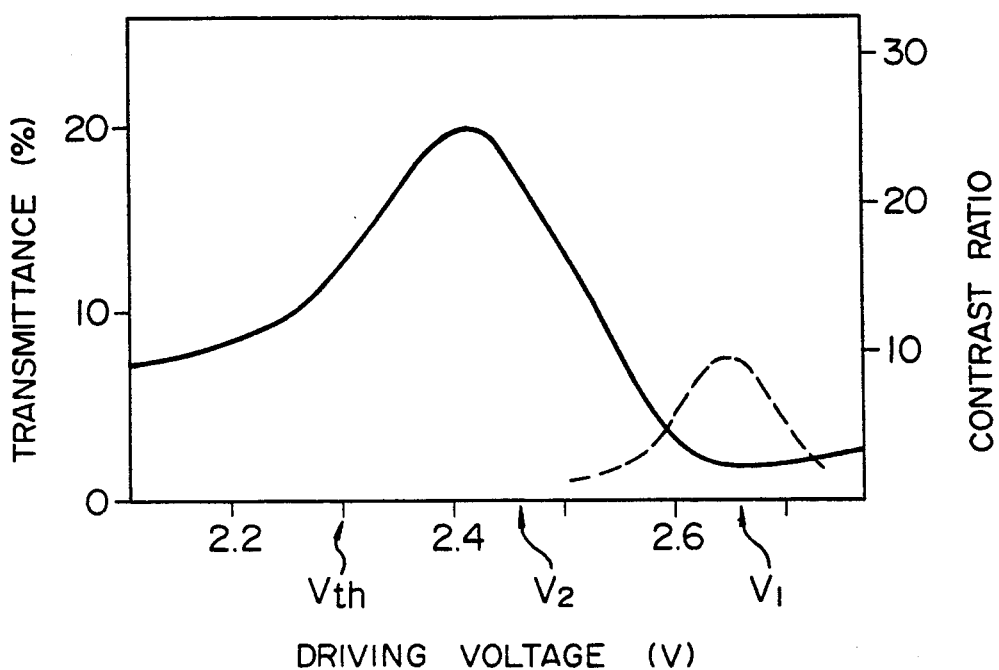
FIG. 6 is graphs showing relations between the transmittance as well as the contrast ratio and the driving voltage of the liquid crystal display device according to still another embodiment of the present invention.

An AC voltage of 1 kHz was applied to this liquid crystal display device and the dependency of the transmittance on the applied voltage thereof was measured. A result thus obtained is indicated by a full line in FIG. 6. The minimum value of the transmittance was obtained at 2.65 V (1.15×Vth) and it was 2.0%. On the other hand the maximum value of the transmittance was obtained at 2.41 V (1.05×Vth) and it was 20%.

This liquid crystal display device was driven under the driving condition that duty ratio is 1/200 and the dependency of the contrast ratio thereof was measured. A result thus obtained is indicated by a broken line in FIG. 6. The maximum value of the contrast ratio was obtained at 2.64 v (1.15×Vth) and it was 8.2.

The response time was measured at 22° C., when the liquid crystal display device was driven between $V_1$ and $V_2$, $V_1$ being set at 2.64 V (1.15×Vth), at which the maximum value of the contrast ratio is obtained, $V_2$ being set at 2.46 V (1.07×Vth). A rise time of $T_R = 90$ ms and a fall time $T_F = 170$ ms were found.

Owing to the fact that the setting angles of the optical anisotropic layers were set in a region between 60° and 90°, i.e. A2=84° and B2=79°, as described above, the display in the dark state became darker and the contrast ratio was further increased under the condition that the response time and the display quality are compatible.

[EMBODIMENT 4]

The setting angles of the optical anisotropic layers 17a and 17b and the polarizer 13a and 13b used in the liquid crystal display device in EMBODIMENT 1 were changed. That is, they were set at A1=102°, A2=75°, B1=102° and B2=78°. At this time, the angle formed by the absorbing axes Pa and Pb of the two polarizers 13a and 13b was 79°.

The dependency of the transmittance on the applied voltage of the liquid crystal display device described above was measured by using an AC electric field of 1 kHz. A result thus obtained is indicated by a full line in FIG. 31. The maximum value of 21% was obtained at 2.41 V (Vth×1.05) and the minimum value of 1.7% was obtained at 2.61 V (Vth×1.13).

The dependency of the contrast ratio on the applied voltage of the liquid crystal display device described above was measured by using an AC rectangular wave of 1 kHz under a driving condition that duty ratio is 1/200. A result thus obtained is indicated by a broken line in FIG. 31. Concerning the contrast, the abscissa in FIG. 31 represents the voltage on the higher voltage side, when the liquid crystal display device is driven under the driving condition that duty ratio is 1/200. The peak value of the contrast ratio was obtained at 2.61 V (Vth×1.13) and it was 9.

$V_1$ was set at 2.61 V (Vth×1.13), at which the maximum value of the contrast ratio is obtained, and $V_2$ was set at 2.43 V (Vth×1.06). The response time was measured at 22° C. for $V_1$ and $V_2$ described above and a $0.87 \leq V_1/V_2 = 1.15$, the transmittance is never smaller than 2%, when one of them is applied thereto, and never greater than 12%, when the other of them is applied thereto.

Figure 7:
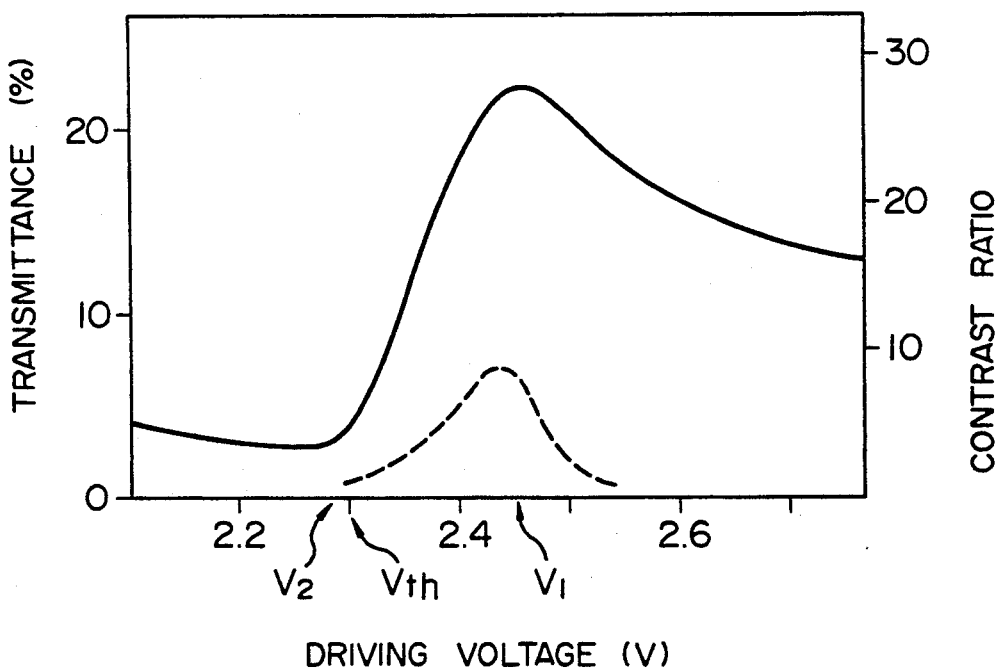
FIG. 7 is graphs showing relations between the transmittance as well as the contrast ratio and the driving voltage of the liquid crystal display device according to an example for comparison.

The dependency of the contrast ratio on the driving voltage, when this liquid crystal display device is driven under the driving condition that duty ratio is 1/200, is indicated by a broken line in FIG. 7. The greatest contrast ratio was obtained at 2.44 V and it was 7.9:1. The driving voltage $V_1$ was set at 2.44 V (1.06×Vth), at which the greatest contrast ratio is obtained, and the driving voltage $V_2$ was set at 2.28 V (0.99×Vth). The transmittance at $V_1$ was 20%. The response time was measured at 22° C. and a rise time of $T_R=350$ ms and a fall time of $T_F=180$ ms were found. Compared with EMBODIMENT 1, the response time was remarkably elongated. Also when A1, A2, B1 and B2 were set at values other than those described above, the greatest contrast ratio was obtained below a voltage, which was 1.02 times as high as the threshold voltage described above. The response time, when the liquid crystal display device was driven at the voltage, at which the greatest contrast ratio was obtained, was in all the cases 1.9 to 2.0 times as long as that obtained in EMBODIMENT 1.

[EXAMPLE FOR COMPARISON 2]

The nematic liquid crystal material described rise time of $T_R=80$ ms and a fall time of $T_F=190$ ms more found.

Owing to the fact that the setting angles of the optical anisotropic layers 17a and 17b and the polarizers 13a and 13b were set as described above, the display in the dark state became darker and the contrast ratio was further increased under the condition that the response time and the display quality are compatible.

[EXAMPLE FOR COMPARISON 1]

The incident and the exit optical anisotropic layer 17a and 17b used in the liquid crystal display device in EMBODIMENT 4 were changed to those represented by $\Delta n_1 = \Delta n_2 = 0.0054$, $d_1 = d_2 = 130$ μm, and $\Delta n_1.d_1 = \Delta n_2.d_2 = 700$ mm so that $(\Delta n_1.d_1 + \Delta n_2.d_2)/(\Delta n_{LC}.d_{LC}) = 0.98$.

In this case the angles were so set that A1=88°, A2=100°, B1=108° and B2=72°. At this time, the angle of the absorbing axes Pa and Pb of the two polarizers 13a and 13b was 77°.

The dependency of the transmittance on the driving voltage of this liquid crystal display device is indicated by a full line in FIG. 7. The minimum value of the transmittance was obtained at 2.28 V (Vth ×0.99) and it was 3.8%. The maximum value of the transmittance was obtained at 2.46 V (Vth×1.07) and it was 22%. When the two voltages $V_1$ and $V_2$ are on the side of the voltage higher than the threshold voltage Vth and above was replaced by a product RDP-91206-1 fabricated by Rodic Ltd. Co. having a birefringence $\Delta n_{LC}$ of 0.107 in the liquid crystal display device used in EMBODIMENT 4. The threshold voltage Vth of this liquid crystal display device was measured similarly to EMBODIMENT 1 and 1.24 V was obtained. The incident optical anisotropic layer 17b was replaced by another having $\Delta n_2.d_2 = 0.40$ μm and the exit optical anisotropic layer 17a was removed. $\Delta n_{LC}.d_{LC}$ of the nematic liquid crystal layer 12 was 0.64 μm and $(\Delta n_2.d_2)/(\Delta n_{LC}.d_{LC}) = 0.63$.

In this case the angles were set so that A1=77°, A2=105°, B1=146° and B2=106°. At this time the angle formed by the absorbing axes Pa and Pb of the two polarizers 13a and 13b was 81°.

Figure 8:
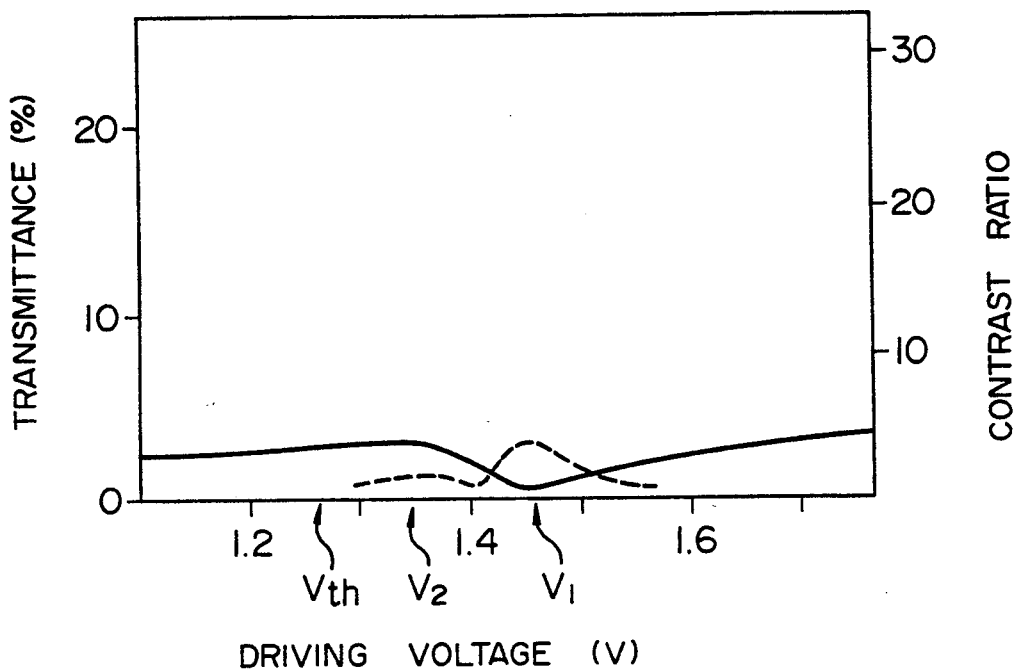
FIG. 8 is graphs showing relations between the transmittance as well as the contrast ratio and the driving voltage of the liquid crystal display device according to another example for comparison.

The dependency of the transmittance on the driving voltage of this liquid crystal display device is indicated by a full line in FIG. 8. The maximum value of the transmittance was obtained at 1.35 V and it was 3.6%. The minimum value of the transmittance was obtained at 1.45 V and it was 0.8%. Further the dependency of the contrast ratio on the driving voltage when this liquid crystal display device is driven with a duty cycle of 1/200 is indicated by a broken line in FIG. 8. The greatest contrast ratio was obtained at 1.45 V and it was 4:1. The driving voltage $V_1$ was set at 1.45 V (1.17×Vth), at which the greatest contrast ratio was obtained, and the driving voltage $V_2$ was set at 1.35 V (1.09×Vth). The transmittance at $V_2$ was 3.2%. The response time was measured at 22° C., while driving this liquid crystal display device between $V_1$ and $V_2$ and a rising time of $T_R=70$ ms and a falling time of $T_F=190$ ms were found. Although the response time was almost equal to that obtained in EMBODIMENT 1, as described above, the transmittance in the bright state and the greatest contrast ratio were significantly lowered.

In a state, where $V_2$ (Vth×1.09) was applied thereto, the Stokes' parameters ($S_1$, $S_2$, $S_3$) of the transmitted light incident on the exit polarizer were measured and $S_1 = -0.30$, $S_2 = -0.88$ and $S_3 = 0.15$ were found. At $V_1$ (Vth×1.17), the Stokes' parameters ($S_1'$, $S_2'$, $S_3'$) were similarly measured and $S_1' = -0.61$, $S_2' = -0.65$ and $S_3' = -0.46$ were found. At this time $0.5 \times (1 - S_1 S_2' - S_2 S_2' - S_3 S_3') = 0.157$, which was decreased remarkably, compared with that obtained in EMBODIMENT 1.

[EXAMPLE OF COMPARISON 3]

The nematic liquid crystal material described above was replaced by a product RDP-91206-1 produced by Rodic Ltd. Co. having a birefringence $\Delta n_{LC}$ of 0.107 in the liquid crystal display device used in EMBODIMENT 4. The thickness $d_{LC}$ of the nematic liquid crystal layer 12 was 12.8 $\mu$m. The threshold voltage Vth of this liquid crystal display device was measured and it was 1.25 V. $\Delta n_{LC} \cdot d_{LC}$ of the nematic liquid crystal 12 was 1.37 $\mu$m and $(\Delta n_1 \cdot d_1 + \Delta n_2 \cdot d_2)/(\Delta n_{LC} \cdot d_{LC}) = 0.73$.

In this case the angles were set so that A1=50°, A2=85°, B1=136° and B2=80°. At this time the angle formed by the absorbing axes Pa and Pb of the two polarizers 13a and 13b was 77°.

Figure 9:
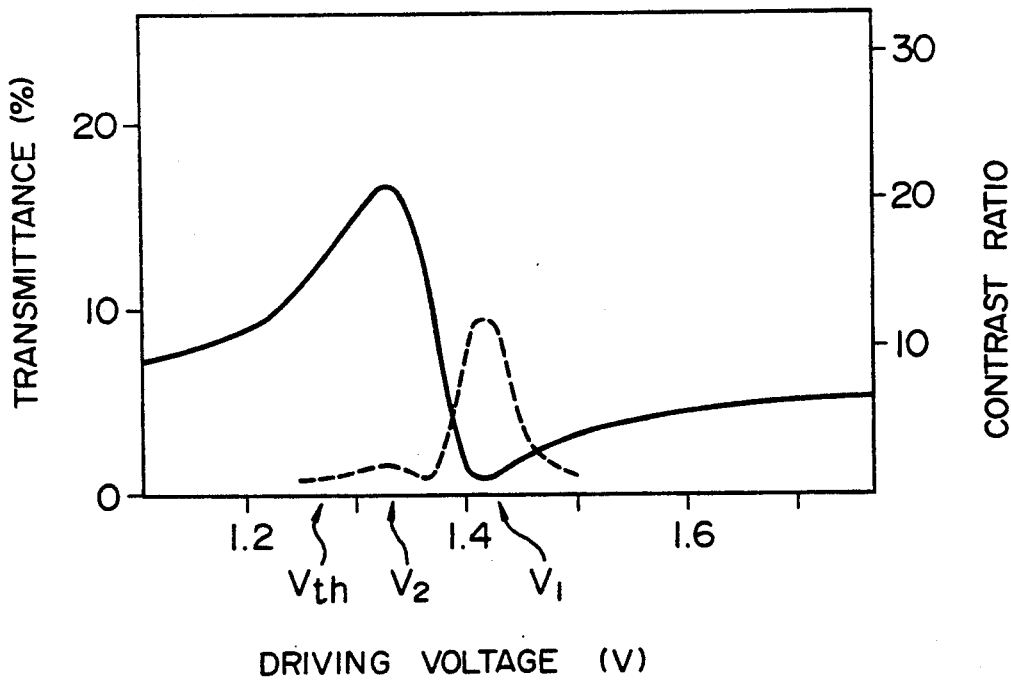
FIG. 9 is graphs showing relations between the transmittance as well as the contrast ratio and the driving voltage of the liquid crystal display device according to still another example for comparison.

The dependency of the transmittance on the driving voltage of this liquid crystal display device is indicated by a full line in FIG. 9. The maximum value of the transmittance was obtained at 1.33 V (Vth×1.06) and it was 16.4%. The minimum value of the transmittance was obtained at 1.41 V (Vth×1.13) and it was 1.2%. The ratio of the voltages giving the maximum value and the minimum value, respectively, was 1.06. Further the dependency of the contrast ratio on the driving voltage, when this liquid crystal display device was driven with a duty cycle of 1/200, is indicated by a broken line in FIG. 9. The greatest contrast ratio was obtained at 1.41 V and it was 12:1. The driving voltage $V_1$ was set at 1.41 V (1.09×Vth), at which the greatest contrast ratio was obtained, and the driving voltage $V_2$ was set at 1.31 V (1.05×Vth). The transmittance at $V_2$ was 14%. The response time was measured at 22° C., while driving the liquid crystal display device between $V_1$ and $V_2$ and a rise time of $T_R$=360 ms and a fall time of $T_F$=760 ms were found. As described above, although the transmittance in the bright state and the greatest contrast ratio were almost equal to those obtained in EMBODIMENT 1, the response time was elongated to almost twice by the fact that the thickness $d_{LC}$ of the nematic liquid crystal layer 12 was increased.

[EMBODIMENT 5]

A liquid crystal display device according to another embodiment of the present invention was fabricated in the same way as in EMBODIMENT 1 except that the twist angle of the nematic liquid crystal layer was set at 220° and the concentration of the chiral dopant in the liquid crystal material was set at 0.85 weight %. $(\Delta n_1 \cdot d_1 + \Delta n_2 \cdot d_2)/(\Delta n_{LC} \cdot d_{LC}) = 0.73$. The dependency of the electric capacity on the driving voltage of this liquid crystal cell was measured by applying an AC voltage of 1 kHz thereto. Examining an (electric capacity-driving voltage) curve obtained therefor (corresponding to FIG. 21), Va=2.39 V, Ca=97.4 $\mu$F, Co=75.9 $\mu$F and $\alpha$=189 $\mu$F/V were found. The threshold voltage (Vth) was obtained using Eq. [2], starting therefrom and Vth=2.28 V was found.

A phase plate having $\Delta n_1$ of 0.004, $d_1$ of 100 $\mu$m and $\Delta n_1 \cdot d_1$ of 400 nm was used for the exit optical anisotropic layer 17a, while another phase plate having $\Delta n_2$ of 0.0053, $d_2$ of 105 $\mu$m and $\Delta n_2 \cdot d_2$ of 560 nm was used for the incident optical anisotropic layer 17b.

Further the angles were so set that A1=107°, A2=75°, B1=130° and B2=78°. The angle formed by the absorbing axes Pa and Pb of the two polarizers 13a and 13b was 86°.

Figure 10:
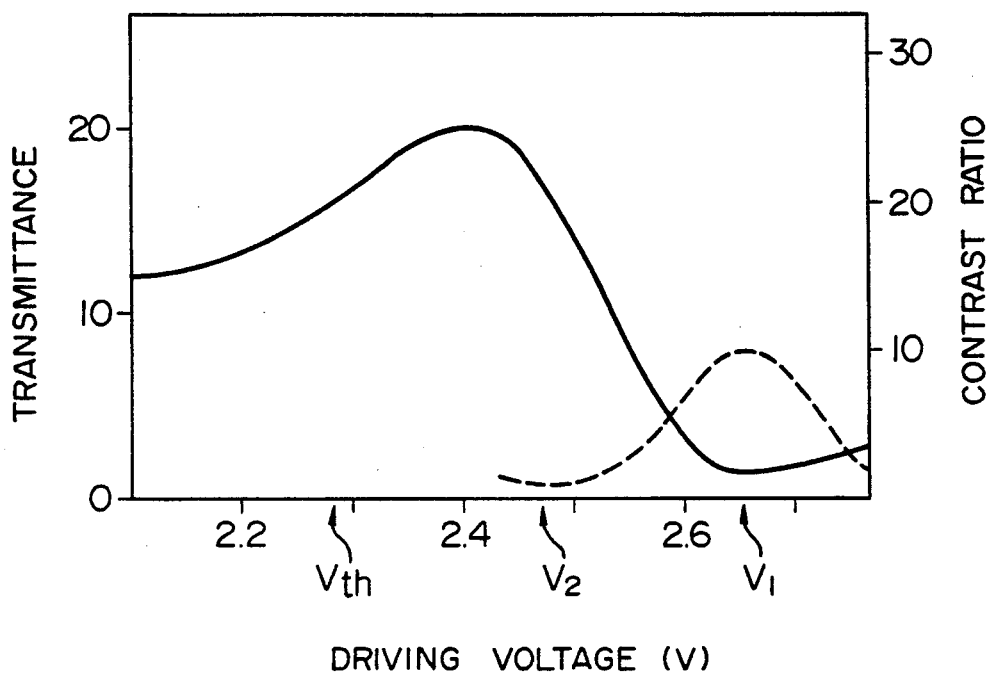
FIG. 10 is graphs showing relations between the transmittance as well as the contrast ratio and the driving voltage of the liquid crystal display device according to still another embodiment of the present invention.

The dependency of the transmittance on the applied voltage of this liquid crystal display device measured by applying an AC voltage of 1 kHz thereto is indicated by a full line in FIG. 10. The maximum value of the transmittance was obtained at 2.41 V (Vth×1.06) and it was 20%. The minimum value thereof was obtained at 2.64 V (Vth×1.16) and it was 1.9%. When the two voltages were on the side of the voltage higher than the threshold voltage Vth and the ratio thereof was 1.095, a transmittance greater than 12% was obtained for one of the voltages and a transmittance smaller than 2% was obtained for the other.

The dependency of the contrast ratio on the applied voltage, when the liquid crystal display device was driven with a duty cycle of 1/200 by applying an AC voltage of 1 kHz, is indicated by a broken line in FIG. 10. The peak value of the contrast ratio was obtained at 2.65 V (Vth×1.16) and it was 10:1. $V_1$ was set at 2.65 V (Vth×1.16), at which the peak value of the contrast ratio was obtained, and $V_2$ was set at 2.47 V (Vth×1.08). The transmittance at the application of $V_2$ was 16%.

The Stokes' parameters ($S_1$, $S_2$, $S_3$) of the transmitted light at $V_1$ were measured and $S_1 = -0.474$, $S_2 = -0.305$ and $S_3 = -0.826$ were found. Further the Stokes' parameters ($S_1'$, $S_2'$, $S_3'$) of transmitted light at $V_2$ were measured and $S_1' = 0.204$, $S_2' = -0.398$, $S_3' = -0.894$ were found. The amount of variation $\Delta E_X$ in the phase difference was 0.856 $\pi$.

The response time was measured at 22° C., while driving the liquid crystal display device between the two voltages $V_1$ and $V_2$ and $T_R$=120 ms and $T_F$=170 ms were found. As described above, even if the twist angle was set at 220°, the response time and the display quality can be compatible.

[EXAMPLE FOR COMPARISON 4]

The liquid crystal material in the liquid crystal display device used in EMBODIMENT 5 was replaced by a product RDP-91206-1 (produced by Radio Ltd. Co.), in which the concentration of the chiral depart in the liquid crystal material was 0.86 weight %. The threshold voltage Vth was obtained, starting from the dependency of the electric capacity on the driving voltage and Vth=1.22 V was found.

A phase plate having $\Delta n_1$=0.003, $d_1$=100 $\mu$m and $\Delta n_1 \cdot d_1$=300 was used for the exit optical anisotropic layer 17a and another phase plate having $\Delta n_2$=0.0031, $d_2$=110 $\mu$m and $\Delta n_2 \cdot d_2$=340 nm was used for the incident optical anisotropic layer 17b.

For the liquid crystal material $\Delta n_{LC}$=0.107, $n_{LC} \cdot d_{LC}$=700 nm and $(\Delta n_1 \cdot d_1 + \Delta n_2 \cdot d_2)/(\Delta n_{LC} \cdot d_{LC})=0.91$.

Further the angles were set so that A1=85°, A2=70°, B1=150° and B2=115°. The angle formed by the absorbing axes Pa and Pb of the two polarizers 13a and 13b was 85°.

Figure 11:
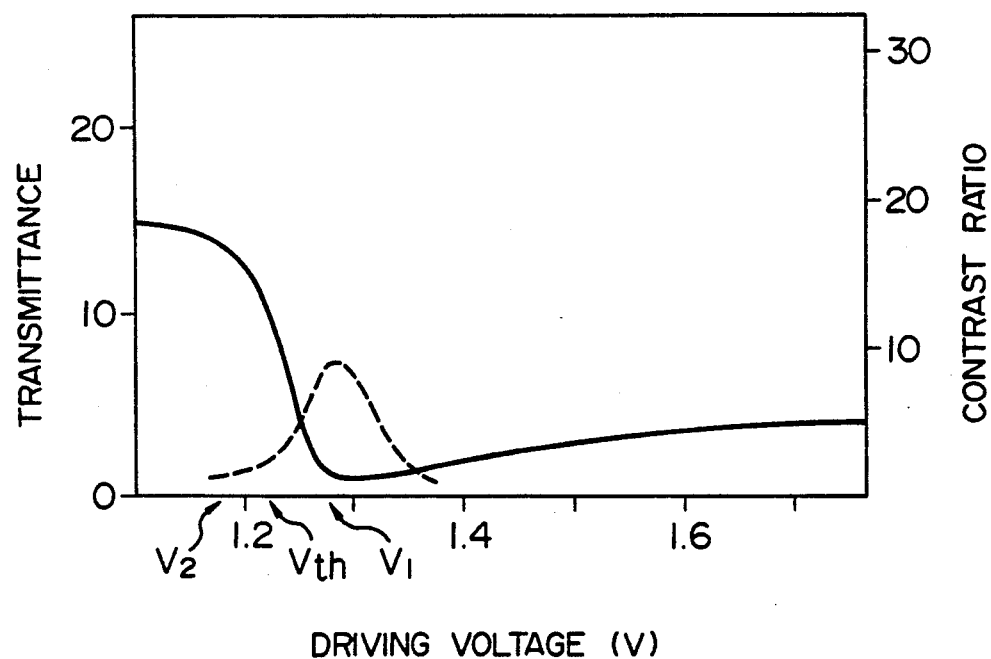
FIG. 11 is graphs showing relations between the transmittance as well as the contrast ratio and the driving voltage of the liquid crystal display device according to still another example for comparison.

The dependency of the transmittance on the applied voltage, measured by applying an AC voltage of 1 kHz, is indicated by a full line in FIG. 11. The minimum value of the transmittance was obtained at 1.28 V (Vth×1.05) and it was 1.7%. When two voltages were on the side of the voltage higher than the threshold voltage Vth and the ratio thereof was greater than 0.87 and smaller than 1.15. There was no solution, by which the transmittance exceeded 12% at one of the voltages and was smaller than 2% at the other of them.

The dependency of the contrast ratio on the applied voltage, when the liquid crystal display device is driven under the driving condition that duty ratio is 1/200 by applying an AC voltage of 1 kHz thereto, is indicated by a broken line in FIG. 11. The maximum value of the contrast ratio was obtained at 1.28 V (Vth×1.05) and it was 8:1. The driving voltage $V_1$ was set at 1.05 V (Vth×1.16), at which the peak value of the contrast ratio was obtained, and the driving voltage $V_2$ was set at 1.19 V (Vth×0.98). The transmittance at the application of $V_2$ was 14%. The response time was measured at 22° C., while driving the liquid crystal display device between the two voltages $V_1$ and $V_2$ and $T_R=280$ ms and $T_F=190$ ms were found.

Because the fact that the liquid crystal material had $\Delta n_{LC}=0.107$, $\Delta n_{LC} \cdot d_{LC}=700$ nm and $(\Delta n_1.d_1+\Delta n_2.d_2)/(\Delta n_{LC}.d_{LC})=0.91$, the response time was elongated to a value, which was more than 1.6 times as long as that obtained in EMBODIMENT 5.

[EMBODIMENT 6]

The liquid crystal display device according to still another embodiment of the present invention was fabricated in the same way as in EMBODIMENT 1 except that the twist angle of the nematic liquid crystal layer 12 was set at 260° and the concentration of the chiral dopant in the liquid crystal material was set at 1.02 weight %. $(\Delta n_1.d_1+\Delta n_2.d_2)/(\Delta n_{LC}.d_{LC})=0.67$. The dependency of the electric capacity on the driving voltage of this liquid crystal cell was measured by applying an AC voltage of 1 kHz thereto. Examining an (electric capacity-driving voltage) curve obtained therefor (corresponding to FIG. 21), Va=2.44 V, Ca=98.7 μF, Co=76.1 μF and α=242 μF/V were found. The threshold voltage (Vth) was obtained, using Eq. [2], starting therefrom and Vth=2.35 V was found.

A phase plate having $\Delta n_1=0.004$, $d_1=100$ μm and $\Delta n_1.d_1=400$ nm was used for the exit optical anisotropic layer 17a, while another phase plate having $\Delta n_2=0.0053$, $d_2=105$ μm and $\Delta n_2.d_2=560$ nm was used for the incident optical anisotropic layer 17b.

Further the angles were set so that A1=30°, A2=88°, B1=151° and B2=110°. The angle formed by the absorbing axes Pa and Pb of the two polarizers 13a and 13b was 81°.

Figure 12:
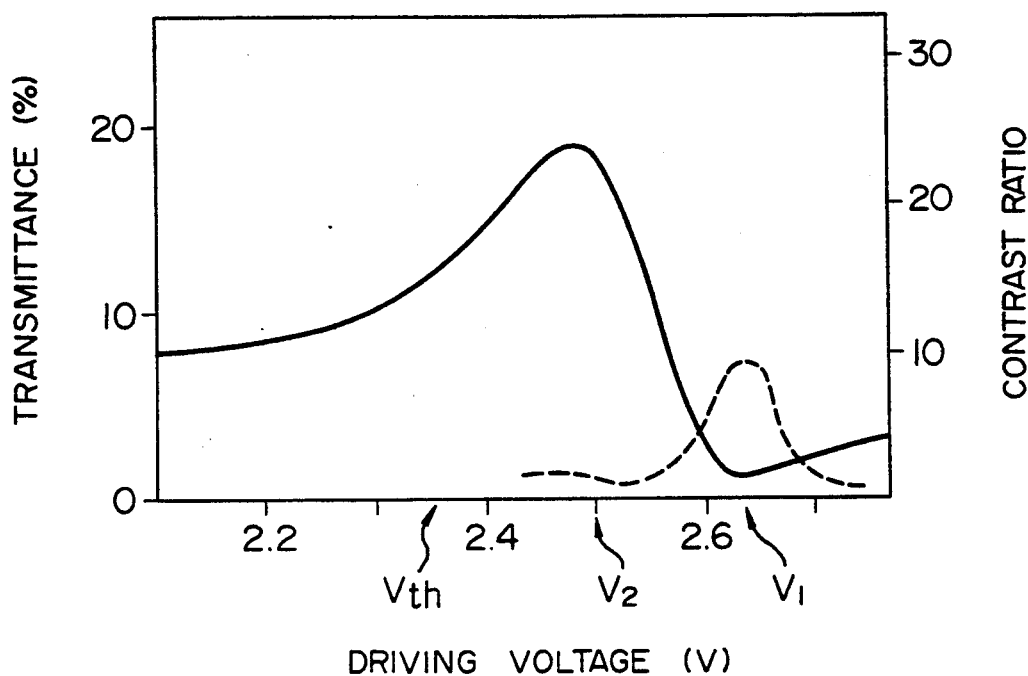
FIG. 12 is graphs showing relations between the transmittance as well as the contrast ratio and the driving voltage of the liquid crystal display device according to still another embodiment of the present invention.

The dependency of the transmittance on the applied voltage measured by applying an AC voltage of 1 kHz thereto is indicated by a full line in FIG. 12. The maximum value of the transmittance was obtained at 2.49 V (Vth×1.06) and it was 19%. The minimum value thereof was obtained at 2.63 V (Vth×1.12) and it was 1.8%. When the two voltages were on the side of the voltage higher than the threshold voltage Vth and the ratio thereof was 1.056, a transmittance greater than 12% was obtained for one of the voltages and a transmittance smaller than 2% was obtained for the other.

The dependency of the contrast ratio on the applied voltage, when the liquid crystal display device was driven under the driving condition that duty ratio is 1/400 by applying an AC voltage of 1 kHz, is indicated by a broken line in FIG. 12. The peak value of the contrast ratio was obtained at 2.63 V (Vth×1.12) and it was 9.4:1. The driving voltage $V_1$ was set at 2.63 V (Vth×1.12), at which the peak value of the contrast ratio was obtained, and the driving voltage $V_2$ was set at 2.50 V (Vth×1.06). The transmittance at the application of $V_2$ was 17%.

The Stokes' parameters ($S_1$, $S_2$, $S_3$) of the transmitted light at $V_1$ were measured and $S_1=-0.363$, $S_2=0.013$ and $S_3=0.932$ were found. Further the Stokes' parameters ($S_1'$, $S_2'$, $S_3'$) of the transmitted light at $V_2$ were measured and $S_1'=-0.154$, $S_2'=-0.608$ and $S_3'=-0.779$ were found. The amount of variation $\Delta E_X$ in the phase difference was 0.839 π.

The response time was measured at 22° C., while driving the liquid crystal display device between the two voltages $V_1$ and $V_2$ and $T_R=90$ ms and $T_F=210$ ms were found.

As described above, also in the case where the twist angle is set at 260° and a highly multiplex driving is effected under the driving condition that duty ratio is 1/400, the response time and the display quality can be compatible.

[EMBODIMENT 7]

A liquid crystal display device according to still another embodiment of the present invention was fabricated in the same way as in EMBODIMENT 1 except that the twist angle of the nematic liquid crystal layer 12 was set at 200° and the concentration of the chiral dopant in the liquid crystal material was set at 0.81 weight %. $(\Delta n_1.d_1+\Delta n_2.d_2)/(\Delta n_{LC}.d_{LC})=0.67$. The dependency of the electric capacity on the driving voltage of this liquid crystal cell was measured by applying an AC voltage of 1 kHz thereto. Examining an (electric capacity-driving voltage) curve obtained therefor (corresponding to FIG. 21), Va=2.37 V, Ca=97.6 μF, Co=75.8 μF and α=173 μF/V. The threshold voltage (Vth) was obtained, using Eq. [2], starting therefrom and Vth=2.24 V was found.

A phase plate having $\Delta n_1$ of 0.004, $d_1$ of 100 μm and $\Delta n_1.d_1$ of 400 nm was used for the exit optical anisotropic layer 17a, while another phase plate having $\Delta n_2$ of 0.0053, $d_2$ of 105 μm and $\Delta n_2.d_2$ of 560 nm was used for the incident optical anisotropic layer 17b.

Further the angles were so set that A1=123°, A2=77°, B1=130° and B2=113°. The angle formed by the absorbing axes Pa and Pb of the two polarizers 13a and 13b was 88°.

Figure 13:
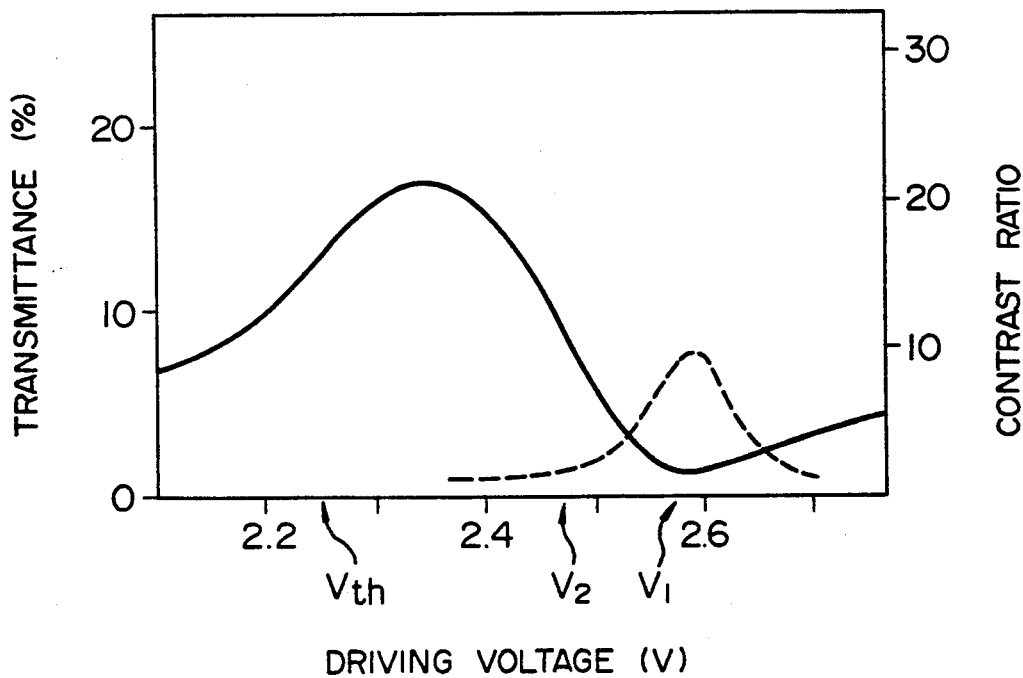
FIG. 13 is graphs showing relations between the transmittance as well as the contrast ratio and the driving voltage of the liquid crystal display device according to still another embodiment of the present invention.

The dependency of the transmittance on the applied voltage of this liquid crystal display device by applying an AC voltage of 1 kHz thereto is indicated by a full line in FIG. 13. The maximum value of the transmittance was obtained at 2.35 V (Vth×1.05) and it was 17%. The minimum value thereof was obtained at 2.58 V (Vth×1.15) and it was 1.7%. When the two voltages were on the side of the voltage higher than the threshold voltage Vth and the ratio thereof was 1.098, a transmittance greater than 12% was obtained for one of the voltages and a transmittance smaller than 2% was obtained for the other.

The dependency of the contrast ratio on the applied voltage, when the liquid crystal display device was driven under the driving condition that duty ratio is 1/200 by applying an AC voltage of 1 kHz, is indicated by a broken line in FIG. 13. The peak value of the contrast ratio was obtained at 2.58 V (Vth×1.15) and it was 9.4:1. The driving voltage $V_1$ was set at 2.58 V (Vth×1.15), at which the peak value of the contrast ratio was obtained, and the driving voltage $V_2$ was set at 2.40 V (Vth×1.07). The transmittance at the application of $V_2$ was 16%.

The Stokes' parameters ($S_1$, $S_2$, $S_3$) of the transmitted light at $V_1$ were measured and $S_1=-0.014$, $S_2=0.932$ and $S_3=0.363$ were found. Further the Stokes' parameters ($S_1'$, $S_2'$, $S_3'$) of transmitted light at $V_2$ were measured and $S_1'=-0.570$, $S_2'=-0.477$, $S_3'=0.670$ were found. The amount of variation $\Delta E_X$ in the phase difference was 0.597 π.

The response time was measured at 22° C., while driving the liquid crystal display device between the two voltages $V_1$ and $V_2$ and $T_R = 140$ ms and $T_F = 160$ ms were found.

As described above, even in the case where the twist angle was set at 200° C., the response time and the display quality can be compatible.

[EMBODIMENT 8]

In the present embodiment, instead of the electrodes 15a and 15b, which are stripe-shaped in the liquid crystal display device in EMBODIMENT 4, circular electrodes 15a' and 15b' are used, as indicated in FIG. 14. Apart therefrom, the liquid crystal material, the thickness of the nematic liquid crystal layer, the angles of the optical anisotropic layers and the polarizers, etc. were set completely identically to those used in EMBODIMENT 1. FIG. 14 shows the construction of the liquid crystal display device according to the present embodiment. In FIG. 14, the constituent parts identical to those shown in FIG. 2 are indicated by same reference numerals.

The dependence of the transmittance of the electrode part on the driving voltage of the liquid crystal display device according to the present embodiment was measured by using an AC voltage of 1 kHz. A result thus obtained is indicated by a full line in FIG. 15. The maximum value of the transmittance was obtained at 2.41 V (Vth × 1.05) and it was 20%. The minimum value of the transmittance was obtained at 2.60 V (Vth × 1.13) and it was 0.6%. When the two voltages were on the side of the voltage higher than the threshold voltage Vth and the ratio thereof was 1.079, a transmittance greater than 12% was obtained for one of the voltages and a transmittance smaller than 2% was obtained for the other.

Figure 15:
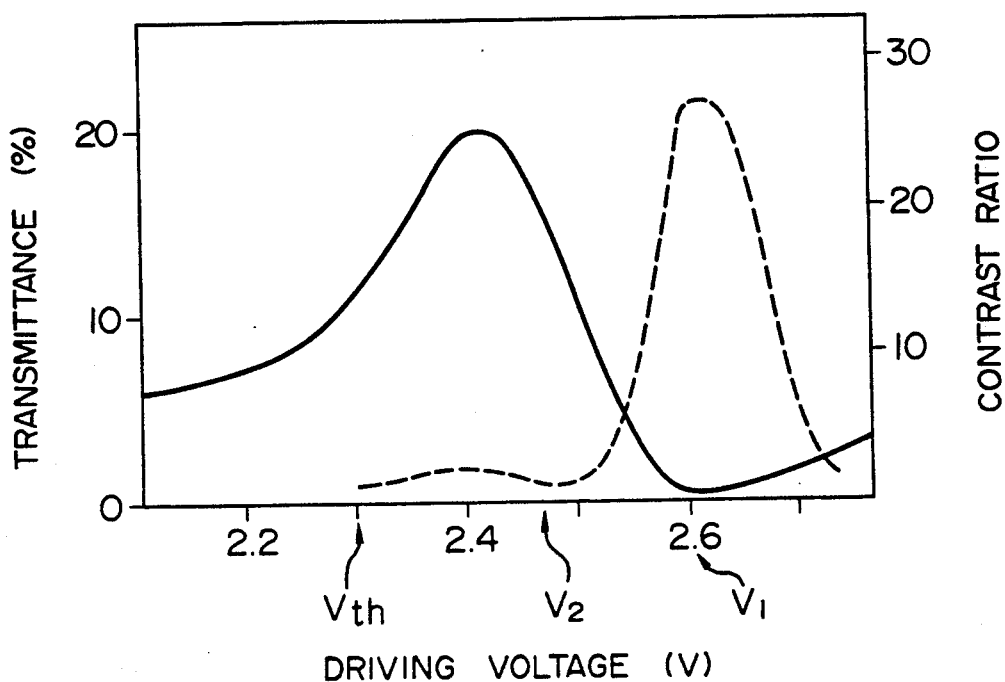
FIG. 15 is graphs showing relations between the transmittance as well as the contrast ratio and the driving voltage of the liquid crystal display device according to the other embodiment of the present invention.

The dependency of the contrast ratio on the applied voltage, when the liquid crystal display device was driven under the driving condition that duty ratio is 1/200 by applying an AC voltage of 1 kHz, is indicated by a broken line in FIG. 15. The peak value of the contrast ratio was obtained at 2.60 V (Vth × 1.13) and it was 27:1. The driving voltage $V_1$ was set at 2.60 V (Vth × 1.13), at which the peak value of the contrast ratio was obtained, and the driving voltage $V_2$ was set at 2.47 V (Vth × 1.08). The transmittance at the application of $V_2$ was 16%. The response time was measured at 22° C., while driving the liquid crystal display device between the two voltages $V_1$ and $V_2$ and $T_R = 75$ ms and $T_F = 190$ ms were found.

As described above, also in the liquid crystal display device provided with the circular electrodes 15a' and 15b' as indicated in FIG. 14, the response time and the display quality can be compatible.

[EXAMPLE FOR COMPARISON 5]

Instead of the electrodes 15a and 15b, which were stripe-shaped in the liquid crystal display device in EXAMPLE FOR COMPARISON 1, were replaced by circular electrodes 15a' and 15b'. Apart therefrom, the liquid crystal material, the thickness of the nematic liquid crystal layer, the angles of the optical anisotropic layers and the polarizers, etc. were set completely identically to those used in EXAMPLE FOR COMPARISON 3.

The dependency of the transmittance of the electrode part on the driving voltage of the liquid crystal display device according to the present embodiment was measured by using an AC voltage of 1 kHz. A result thus obtained is indicated by a full line in FIG. 16. The minimum value of the transmittance was obtained at 2.27 V (Vth × 0.99) and it was 2.1%. The maximum value of the transmittance was obtained at 2.46 V (Vth × 1.07) and it was 24%. However the angles A1, A2, B1 and B2 were set, when the two voltages were on the side of the voltage higher than the threshold voltage Vth and the ratio thereof was greater than 0.87 and smaller than 1.15, there was no solution, by which the transmittance was greater than 12% for one of the voltages and smaller tan 2% for the other.

Figure 16:
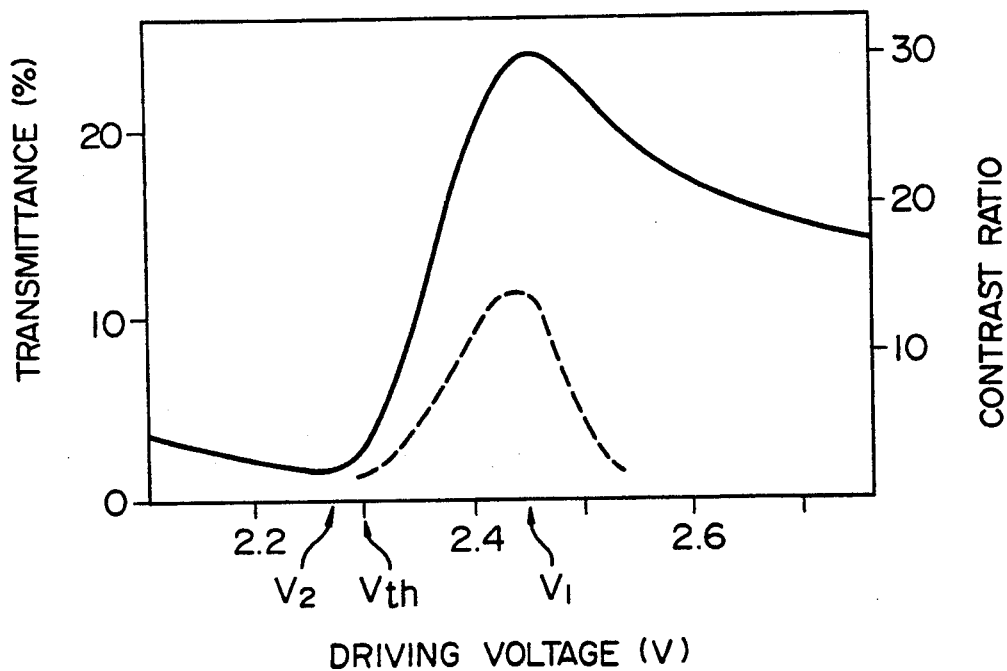
FIG. 16 is graphs showing relations between the transmittance as well as the contrast ratio and the driving voltage of the liquid crystal display device according to an example for comparison.

The dependency of the contrast ratio on the applied voltage, when the liquid crystal display device was driven under the driving condition that duty ratio is 1/200 by applying an AC voltage of 1 kHz, is indicated by a broken line in FIG. 16. The peak value of the contrast ratio was obtained at 2.44 V (Vth × 1.06) and it was 11.5:1. The driving voltage $V_1$ was set at 2.44 V (Vth × 1.06), at which the peak value of the contrast ratio was obtained, and the driving voltage $V_2$ was set at 2.27 V (Vth × 0.99). The transmittance at the application of $V_2$ was 16%. The response time was measured at 22° C., while driving the liquid crystal display device between the two voltages $V_1$ and $V_2$ and $T_R = 340$ ms and $T_F = 175$ ms were found.

As it can be understood by comparing EMBODIMENT 8 with the present EXAMPLE FOR COMPARISON 5, the present invention is useful for a liquid crystal display device having an electrode structure as described e.g. in EMBODIMENT 8 and the present EXAMPLE FOR COMPARISON 5, apart from the liquid crystal cell provided with stripe shaped electrodes. In principle, the present invention is useful for a liquid crystal display device having any electrode structure.

[EMBODIMENT 9]

A liquid crystal cell was constructed by using substrate 11a and 11b provided with absorbing layers 21a and 21b on the parts, where there were no electrodes 15a and 15b on the substrates described above, and a liquid crystal display device was fabricated in the completely same way as in EMBODIMENT 1 except therefor.

Figure 17:
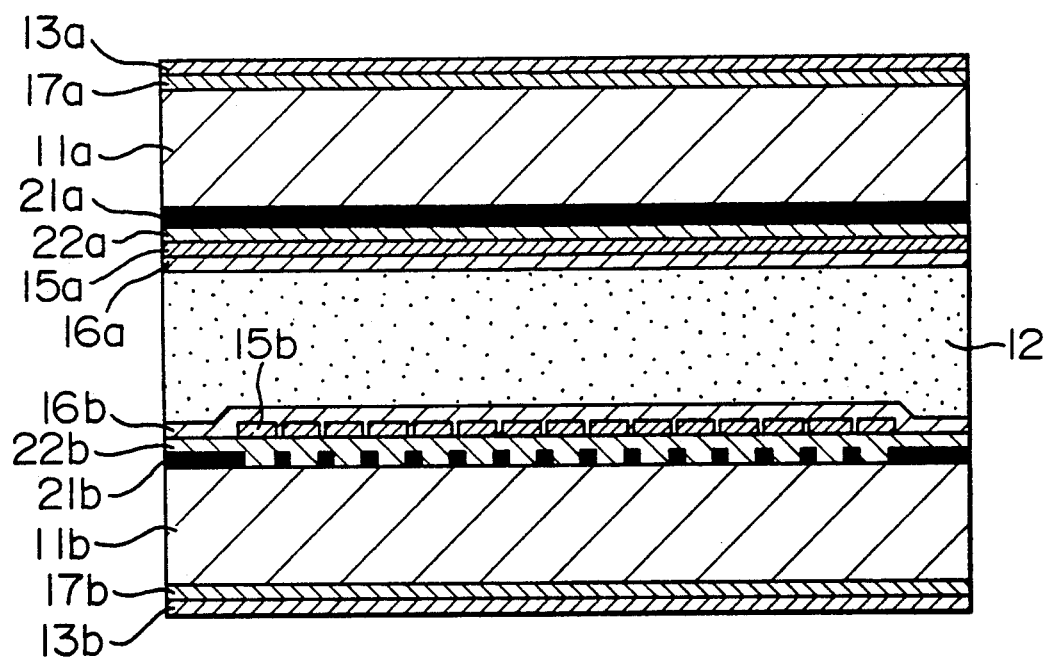
FIG. 17 is a schematical perspective view showing a liquid crystal display device according to still another embodiment of the present invention.

FIG. 17 shows a cross-sectional view of the liquid crystal display device according to the present EMBODIMENT. In FIG. 17, the constituent parts identical to those shown in FIG. 2 are indicated by same reference numerals and 22a and 22b are insulating layers and 21a and 21b are absorbing layers. The insulating layers 22a and 22b are made of $SiO_2$ and the absorbing layers 21a and 21b are made of Cr and formed by the photolithographic method. The electrodes 15a and 15b are stripe-shaped. In accordance therewith, the absorbing layers 21a and 21b are also stripe-shaped and distributed on the parts, where there are no electrodes. Taking positional deviations at the fabrication into account, the width of the absorbing layers 21a and 21b (0.03 mm) is set so as to be wider than the interval between the electrodes (0.01 mm).

Figure 18:
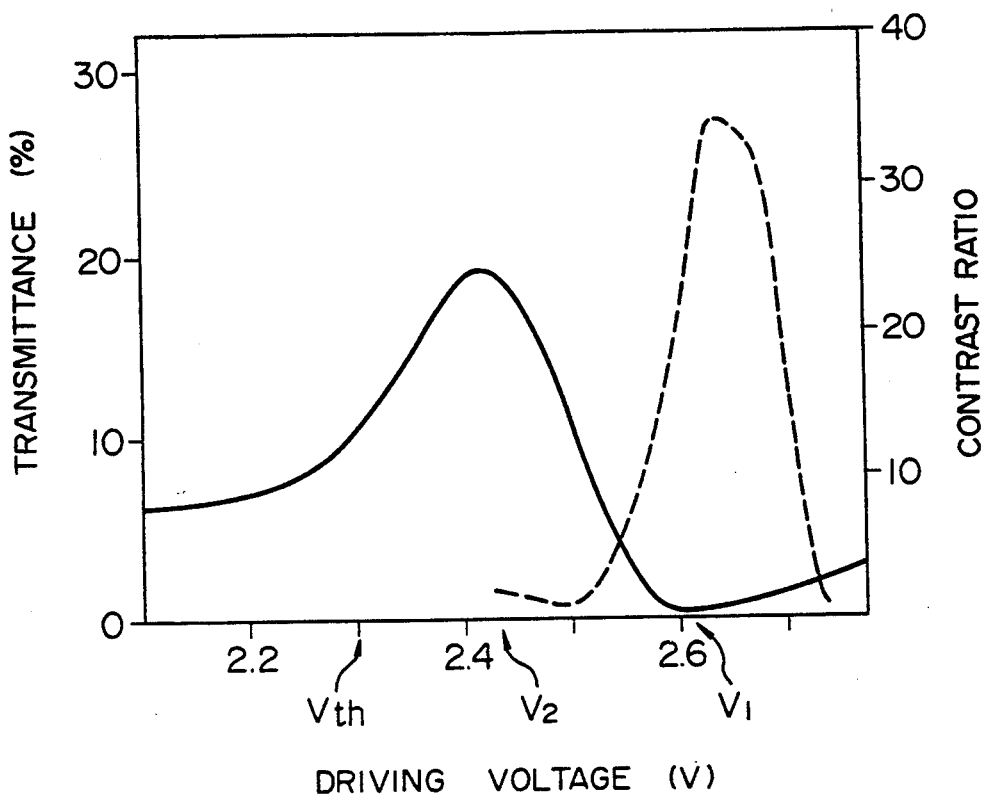
FIG. 18 is graphs showing relations between the transmittance as well as the contrast ratio and the driving voltage of the liquid crystal display device according to the still another embodiment of the present invention.

The dependence of the transmittance on the driving voltage of the present liquid crystal display device, measured by using an AC voltage of 1 kHz is indicated by a full line in FIG. 18. The maximum value of 19% was obtained at 2.41 V (Vth × 1.05) and the minimum value of 0.5% was obtained at 2.60 V (Vth × 1.13). Since light leak from the parts, where there are no electrodes 15a and 15b, is prevented by the absorbing layer 21a and 21b, the minimum value of the transmittance is lower than that obtained by the liquid crystal display device in EMBODIMENT 1.

Further the dependency of the contrast ratio on the applied voltage when the liquid crystal display device is driven under the driving condition that duty ratio is 1/200 is indicated by a broken line in FIG. 18. The maximum value of the contrast ratio was obtained at 2.61 V (Vth×1.11) and it was 34:1. $V_1$ was set at 2.61 V (Vth×1.11), at which the maximum value of the contrast ratio was obtained, and $V_2$ was set at 2.43 V (Vth×1.06). The transmittance at the application of $V_2$ was 17%. The response time when the liquid crystal display device was driven between $V_1$ and $V_2$ was measured and $T_R=75$ ms and $T_F=220$ ms were found.

As described above, although the brightness is somewhat lowered, the contrast ratio is increased remarkably owing to the fact that the liquid crystal display device is provided with the absorbing layers 21a and 21b. Further the response time in this case remains almost unchanged with respect to that obtained in the case it is not provided with the absorbing layers.

[EMBODIMENT 10]

In the present embodiment a liquid crystal display device was fabricated in the completely same way as that used in EMBODIMENT 6 described above except that the liquid crystal cell was constructed by using substrates provided with absorbing layers at the parts, where there were no electrodes 15a and 15b on the substrates.

Figure 19:
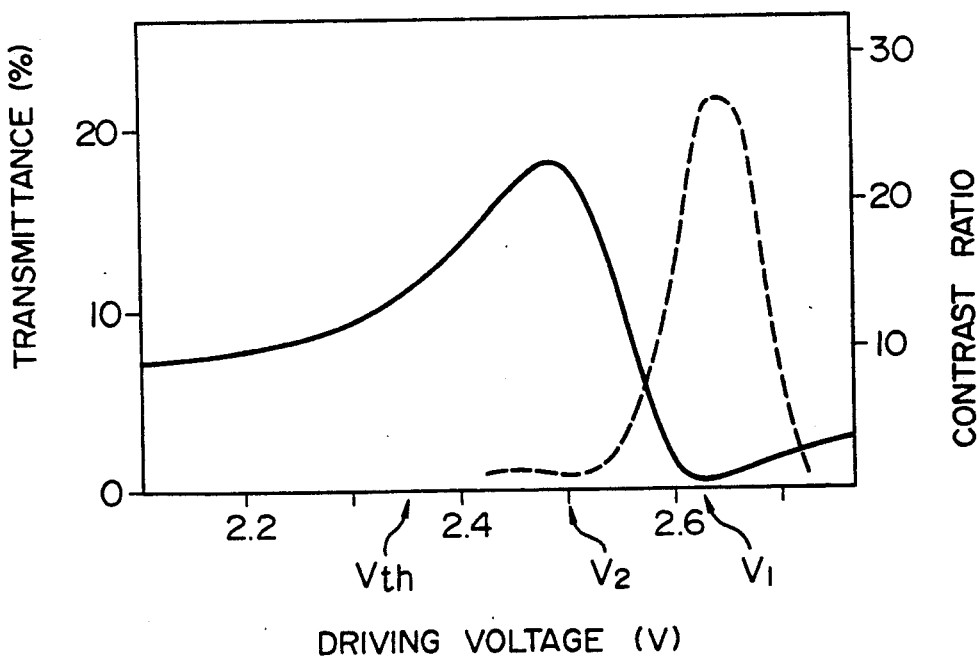
FIG. 19 is graphs showing relations between the transmittance as well as the contrast ratio and the driving voltage of the liquid crystal display device according to still another embodiment of the present invention.

The dependency of the transmittance on the driving voltage of this liquid crystal device, measured by using an AC electric field of 1 kHz, is indicated by a full line in FIG. 19. The maximum value of 18% was obtained at 23.49 V (Vth×1.06) and the minimum value of 0.6% was obtained at 2.63 V (Vth×1.12). Since light leak from the parts, where there were no electrodes is prevented by the absorbing layers, the minimum value of the transmittance is lowered with respect to that obtained by the liquid crystal display device described in EMBODIMENT 3.

Further the dependency of the contrast ratio on the driving voltage, when the liquid crystal display device is driven under the driving condition that duty ratio is 1/400, is indicated by a broken line in FIG. 19. The maximum value of the contrast ratio was obtained at 2.63 V (Vth×1.12) and it was 27:1. $V_1$ was set at 2.63 V (Vth×1.12), at which the maximum value of the contrast ratio was obtained, and $V_2$ was set at 2.50 V (Vth×1.06). The transmittance at the application of $V_2$ was 16%. The response time when the liquid crystal display device was driven between $V_1$ and $V_2$ was measured and $T_R=90$ ms and $T_F=220$ ms were found.

As described above, although the brightness is somewhat lowered, the contrast ratio is increased remarkably owing to the fact that the liquid crystal display device is provided with the absorbing layers. Further the response time in this case remains almost unchanged with respect to that obtained in the case where it is not provided with the absorbing layers.

An aspect of a notebook type personal computer, on which the liquid crystal display according to the present invention is mounted, is indicated in FIG. 20.

[EMBODIMENT 11]

In the liquid crystal display device described in EMBODIMENT 9, $V_1$ was set at 2.61 V (Vth×1.13) similarly to EMBODIMENT 9 and $V_2$ was set at 2.48 V (Vth×1.08). The transmittance was 14% at the application of $V_2$ and 0.5% at the application of $V_1$. The ratio of $V_2$ to $V_1$ corresponds to a drive under the driving condition that duty ratio is 1/400. The contrast ratio, which is the ratio of the transmittance at the application of $V_2$ to the transmittance at the application of $V_1$, was 34:1. The response time when the liquid crystal display device was driven between $V_1$ and $V_2$ was measured and $T_R=85$ ms and $T_F=220$ ms were found.

As described above, by the liquid crystal display device according to the present invention, since the optical setting conditions as described above are adopted, the dependency of the transmittance on the driving voltage is abrupt and the display quality and the response time can be compatible even in a high multiplex driving under the driving condition that duty ratio is 1/400.

[EMBODIMENT 12]

In the liquid crystal display device described in EMBODIMENT 10, $V_1$ was set at 2.63 V (Vth×1.12) similarly to EMBODIMENT 10 and $V_2$ was set at 2.54 V (Vth×1.08). The transmittance was 14% at the application of $V_2$ and 0.6% at the application of $V_1$. The ratio of $V_2$ to $V_1$ is 1.036, which corresponds to a drive with a duty cycle of 1/800. The contrast ratio, which is the ratio of the transmittance at the application of $V_2$ to the transmittance at the application of $V_1$ was 23:1.

The Stokes' parameters ($S_1$, $S_2$, $S_3$) of the transmitted light at $V_1$ were measured and $S_1=-0.363$, $S_2=0.013$ and $S_3=0.932$ were found. Further the Stokes' parameters ($S_1'$, $S_2'$, $S_3'$) of transmitted light at $V_2$ were measured and $S_1'=-0.661$, $S_2'=-0.661$ and $S_3'=-0.353$ were found. The amount of variation $\Delta E_X$ in the phase difference was $0.558\,\pi$.

The response time when the liquid crystal display device driven between $V_1$ and $V_2$ was measured and $T_R=85$ ms and $T_F=230$ ms were found.

As described above, by the liquid crystal display device according to the present invention, since the optical setting conditions as described above are adopted, the dependency of the transmittance on the driving voltage is abrupt and the display quality and the response time can be compatible even in a high multiplex driving under the driving condition that duty ratio is 1/800.

[EMBODIMENT 13]

The mixture of the liquid crystal material and the chiral dopant used in EMBODIMENT 4 was injected into a liquid crystal cell for a notebook type personal computer B16NX (fabricated by Hitachi Ltd. Co.). Optical anisotropic layers were disposed between the liquid crystal cell and the polarizers mounted above and below it. Phase plates identical to those used in EMBODIMENT 4 were used for the optical an isotropic layers. The setting angles for the polarizers and the optical anisotropic layers were identical also to those used in EMBODIMENT 4. As the result, a liquid crystal display device having the same dependency of the transmittance on the driving voltage as in EMBODIMENT 4 was obtained. This liquid crystal display device was connected with the notebook type personal computer described above and a pointing device was driven.

This liquid crystal display device has a transmittance of 3.3% at $V_1$ (2.61 V) and 15% at $V_2$ (2.43 V) and a normally open type dependency of the transmittance on the driving voltage. Consequently the background was displayed in the dark state and the pointer in the bright state. The state of the pointer was observed while increasing gradually the moving speed of the pointing device.

In the case where the moving speed of the pointer on the screen was about 3 cm/s, the pointer thus obtained was as good as a still image. Next, when the moving speed was increased to about 6 cm/s, the displayed pointer image trailed a tail about 3 cm long. At a moving speed of 10 cm/s the displayed pointer became unclear, but it was possible to confirm the position thereof on the screen.

[EMBODIMENT 14]

The background was displayed in the bright state and the display pointer was displayed in the dark state in the notebook type personal computer described in EMBODIMENT 13 having the normally open type dependence of the transmittance on the driving voltage. The moving speed of the pointer device was increased gradually and the state of the displayed pointer was observes.

In the case where the moving speed of the displayed pointer on the screen was 3 cm/s, the displayed pointer image remained unchanged, compared with that observed in a still image. In the case where the moving speed was increased to 6 cm/s, the displayed pointer image trailed at tail about 1 cm long, but the pointer image itself didn't become unclear. Further, when the moving speed was increased to 10 cm/s, the tail of the displayed pointer image became longer, but no special abnormalities were observed.

As described above, in the liquid crystal display device having the normally open type dependence of the transmittance on the driving voltage, the clearness of the displayed pointer at a high speed movement was further increased owing to the fact that the displayed pointer was displayed in the dark state.

[EXAMPLE FOR COMPARISON 6]

The mixture of the liquid crystal material and the chiral dopant used in EXAMPLE FOR COMPARISON 2 was injected into a liquid crystal cell for a notebook type personal computer B16NX (fabricated by Hitachi Ltd. Co.). Optical anisotropic layers were disposed between the liquid crystal cell and the polarizers mounted above and below it. Phase plates identical to those used in EMBODIMENT 4 were used for the optical anisotropic layers. The setting angles for the polarizers and the optical anisotropic layers were identical also to those used in EMBODIMENT 4. As the result, a liquid crystal display device having the same dependency of the transmittance on the driving voltage as in EMBODIMENT 4 was obtained. This liquid crystal display device was connected with the notebook type personal computer described above and a pointing device was driven. The moving speed of the pointer device was increased gradually and the state of the displayed pointer was observed.

In the case where the moving speed of the displayed pointer on the screen was 3 cm/s, the displayed pointer image remained unchanged, compared with that observed in a still image. In the case where the moving speed was increased to about 6 cm/s, the displayed pointer became unclear and at 10 cm/s it was not displayed.

The clearness of the displayed pointer at the movement of the pointer was so worsened that the pointer could not be used any more, compared with the case of EMBODIMENT 13.

[EMBODIMENT 15]

In the liquid crystal display device in EMBODIMENT 14, variations in the display quality at the scroll were observed. When the scroll was effected with a speed of 3 lines/s, the displayed image remained apparently unchanged, compared with that observed in a still image. In the case where the scroll was effected with a speed of 7 lines/s, display in non-selected parts between two adjacent liens didn't return to the perfect bright state, but it became an obscure display. However it was possible to read-out the display. Further, when the scroll was effected with a speed of 10 lines/s, the display in the non-selected parts between two adjacent lines became more obscure, but the display itself was able to be read-out.

[EXAMPLE FOR COMPARISON 7]

In the liquid crystal display device in EXAMPLE FOR COMPARISON 7, variations in the display quality at the scroll were observed. When the scroll was effected with a speed of 3 lines/s, the displayed image remained unchanged, compared with that observed in a still image. However, when the speed of the scroll was increased to 7 lines/s, the displayed image became unclear. Further, at 10 lines/s, the displayed image was not recognized at all.

[EMBODIMENT 16]

The twist angle of the nematic liquid crystal layer 12 was set at 260°, RDP-00844 (produced by Rodic Ltd. Co.) was used for the liquid crystal material; and the concentration of the chiral dopant in the liquid crystal material was set at 1.07 weight %. Apart therefrom, the liquid crystal display device according to another embodiment of the present invention was fabricated in the same way as in EMBODIMENT 1 stated previously, RDP-00844 has $\Delta n_{LC} = 0.23$ and contains toran molecules as the main component.

An AC voltage of 1 kHz was applied to the liquid crystal cell and the dependency of the electric capacity on the driving voltage of the liquid crystal cell was measured to study the (electric capacitance-driving voltage) curve thereof (corresponding to FIG. 21). $Va = 2.46$ V, $Ca = 102.7$ $\mu$F, $Co = 82.1$ $\mu$F and $\alpha = 244$ $\mu$F/V were found. In this way the threshold voltage (Vth) was obtained, using Eq. [2], and $Vth = 2.38$ V was found.

A phase plate having $\Delta n_1$ of 0.004, $d_1$ of 100 $\mu$m and $\Delta n_1 \cdot d_1$ of 40 nm was used for the exit optical anisotropic layer 17a, while another phase plate having $\Delta n_2$ of 0.0053, $d_2$ of 105 $\mu$m and $\Delta n_2 \cdot d_2$ of 560 nm was used for the incident optical anisotropic layer 17b.

At this time $\Delta n_{LC} \cdot d_{LC} - (\Delta n_1 \cdot d_1 + \Delta n_2 \cdot d_2) = 0.54$ m.

Further the angles were set so that $A1 = 33°$, $A2 = 84°$, $B1 = 144°$ and $B2 = 100°$ and the angle formed by the absorbing axes Pa and Pb of the two polarizers 13a and 13b was 77°.

An AC voltage of 1 kHz was applied to this liquid crystal display device and the dependence of the transmittance on the driving voltage thereof was measured. The maximum value of the transmittance was obtained at 2.49 V (Vth×1.05) and it was 19%. The minimum value of the transmittance was obtained at 2.66 V (Vth×1.12) and it was 2.3%.

The dependency of the contrast ratio on the applied voltage, when the liquid crystal display device was driven under the driving condition that duty ratio is 1/400 was measured, while applying an AC voltage of 1 kHz thereto. The peak value of the contrast ratio was obtained at 2.65 V (Vth×1.11)and it was 7.6. $V_1$ was set at 2.65 V (Vth×1.11), at which the peak value of the contrast ratio was obtained, and $V_2$ was set at 2.52 V (Vth×1.06). The transmittance at the application of $V_2$ was 17.5%

The response time of the liquid crystal display device was measured at 22° C., while driving it between the two voltages $V_1$ and $V_2$, and $T_R=90$ ms and $T_F=220$ ms were found.

As described above, owing to $\Delta n_{LC} \cdot d_{LC} = 1.50$ μm, $\Delta n_{LC} \cdot d_{LC} - (\Delta n_1 \cdot d_1 + \Delta n_2 \cdot d_2) = 0.54$ μm and $\Delta n_{LC} = 0.23$, even if the twist angle is set at 260° and a highly multiplex driving is effected under the driving condition that duty ratio is 1/400, the response time and the display quality can be compatible.

[EXAMPLE FOR COMPARISON 8]

The liquid crystal material of the liquid crystal display device in EMBODIMENT 16 was changed to RDP-91206-1 (produced by Rodic Ltd. Co.) and the concentration of the chiral dopant in the liquid crystal material was set at 0.86 weight %. The threshold voltage Vth was obtained, starting from the dependency of the electric capacity on the driving voltage of the liquid crystal cell, and Vth=1.22 V was found.

A phase plate having $\Delta n_1$ of 0.003, $d_1$ of 100 m and $\Delta n_1 \cdot d_1$ of 300 nm was used for the exit optical anisotropic layer 17a, while a phase plate having $\Delta n_2$ of 0.0031, $d_2$ of 110 μm and $\Delta n_2 \cdot d_2$ of 340 nm was used for the incident optical anisotropic layer 17b.

$\Delta n_{LC}$ of the liquid crystal material is 0.107 and $\Delta n_{LC} \cdot d_{LC}$ is 700 nm. At this time $\Delta n_{LC} \cdot d_{LC} - (\Delta n_1 \cdot d_1 + \Delta n_2 \cdot d_2) = 0.06$ μm.

Further the angles were set so that A1=85°, A2=95°, B1=110° and B2=73° and the angle formed by the absorbing axes Pa and Pb of the two polarizers 13a and 13b was 85°.

The dependency of the transmittance on the driving voltage of the liquid crystal display device was measured, while applying an AC voltage of 1 kHz thereto. The minimum value of the transmittance was obtained at 1.27 V (Vth×1.04) and it was 1.5%. When the two-valued voltages were on the side of the voltage higher than the threshold voltage and the ratio thereof was greater than 0.87 and smaller than 1.15, no solution was found, by which the transmittance exceeded 12% for one of the voltages and it was smaller than 2% for the other.

The dependency of the contrast ratio on the applied voltage of the liquid crystal display device when it was driven with a duty cycle of 1/200 was measured, while applying an AC voltage of 1 kHz thereto. The maximum value of the contrast ratio was obtained at 1.26 V (Vth×1.03) and it was 9:1. $V_1$ was set at 1.05 V (Vth×1.16), at which the peak value of the contrast ratio was obtained, and $V_2$ was set at 1.19 V (Vth×0.98). The transmittance at the application of $V_2$ was 14%.

The response time was measured at 22° C., when the liquid crystal display device was driven between the two voltages $V_1$ and $V_2$, and $T_R=290$ ms and $T_F=185$ ms were found.

As described above, the response time was longer than a value 1.5 times as long as that obtained in EMBODIMENT 2, because of $\Delta n_{LC}=1.07$, $\Delta n_{LC} \cdot d_{LC} = 700$ mm and $\Delta n_{LC} \cdot d_{LC} - (\Delta n_1 \cdot d_1 + \Delta n_2 \cdot d_2) = 0.06$ μm of the liquid crystal material.

[EMBODIMENT 17]

The liquid crystal display device according to still another embodiment of the present invention was fabricated in the same way as in EMBODIMENT 1 except that the twist angle of the nematic liquid crystal layer 12 was set at 220° and the concentration of the chiral dopant in the liquid crystal material was set at 0.85 weight %. The dependency of the electric capacity of the liquid crystal cell was measured, while applying an AC voltage of 1 kHz thereto. Examining the (electric capacity-driving voltage) curve (corresponding to FIG. 21), Va=2.40 V, Ca=97.5 μF, Co=76.3 μF and α=190 μF/V were found. The threshold voltage (Vth) was obtained by using Eq. [2], and Vth=2.29 V was found.

A phase plate having $\Delta n_1$ of 0.004, $d_1=100$ μm and $\Delta n_1 \cdot d_1$ of 400 μm was used for the exit optical anisotropic layer 17a, while another phase plate having $\Delta n_2$ of 0.0053, $d_2$ of 105 μm and $\Delta n_2 \cdot d_2$ of 560 nm was used for the incident optical anisotropic layer 17b.

At this time $\Delta n_{LC} \cdot d_{LC} - (\Delta n_1 \cdot d_1 + \Delta n_1 \cdot d_2) = 0.47$ μm.

Further the angles were set so that A1=104°, A2=78°, B1=133° and B2=80°. The angle formed by the absorbing axes Pa and Pb of the two polarizers 13a and 13b was 83°.

The dependency of the transmittance on the applied voltage of this liquid crystal display device was measured by applying an AC voltage of 1 kHz. The maximum value of the transmittance was obtained at 2.43 V (Vth×1.06) and it was 19.5%. The minimum value was obtained at 2.67 V (Vth×1.17) and it was 1.9%.

The dependency of the contrast ratio on the applied voltage of the liquid crystal display device, when it was driven under the driving condition that duty ratio is 1/200 was measured, while applying an AC voltage of 1 kHz thereto. The peak value of the contrast ratio was obtained at 2.66 V (Vth×1.16) and it was 8. $V_1$ was set at 2.65 V (Vth×1.16), at which the peak value of the contrast ratio was obtained, and $V_2$ was set at 2.47 V (Vth×1.08). The transmittance at the application of $V_2$ was 15.5%.

The response time was measured at 22° C. between the two voltages $V_1$ and $V_2$ and $T_R=130$ ms and $T_F=170$ ms were found.

As described above, owing to $\Delta n_{LC} \cdot d_{LC} = 1.43$ μm, $\Delta n_{LC} \cdot d_{LC} - (\Delta n_1 \cdot d_1 + \Delta n_2 \cdot d_2) = 0.47$ μm and $\Delta n_{LC} = 0.22$, also in the case where the twist angle is set at 220°. The response time and the display quality can be compatible.

[EXAMPLE FOR COMPARISON 9]

The nematic liquid crystal material of the liquid crystal display device in EMBODIMENT 17 was changed to RDP-91206-1 (produced by Rodic Ltd. Co.) having a birefringence of 0.107 and the layer thickness $d_{LC}$ of the nematic liquid crystal layer 12 stated above was changed to 12.5 μm. Vth of this liquid crystal display device was measured and 1.26 V was obtained therefor $\Delta n_{LC} \cdot d_{LC}$ of the nematic liquid crystal layer 12 was 1.34

μm. At this time $\Delta n_{LC} \cdot d_{LC} - (\Delta n_1 \cdot d_1 + \Delta n_2 \cdot d_2) = 0.38$ μm.

In this case the angles were set so that $A1 = 72°$, $A2 = 88°$, $B1 = 134°$ and $B2 = 79°$. At this time, the angle formed by the absorbing axes Pa and Pb of the two polarizers 13a and 13b was 66°.

The dependency of the transmittance on the driving voltage of this liquid crystal display device was measured. The maximum value of the transmittance was obtained at 1.35 V (Vth×1.07) and it was 16.5%. The minimum value of the transmittance was obtained at 1.42 V (Vth×1.13) and it was 1.4%. The ratio of the voltages giving the maximum value and the minimum value was 1.06.

The dependency of the contrast ratio on the driving voltage of the liquid crystal display device, when it was driven under the driving condition that duty ratio is 1/200, was measured. The greatest contrast ratio as obtained at 1.41 V and it was 10:1. $V_1$ was set at 1.41 V (1.12×Vth), at which the greatest contrast ratio was obtained, and $V_2$ was set at 1.31 V (1.04×Vth). The transmittance at $V_2$ was 14.5%.

The response time was measured at 22° C., while driving the liquid crystal display device between the two voltages $V_1$ and $V_2$ and $T_R = 345$ ms and $T_F = 820$ ms were found. As described above, although the transmittance in the bright state and the greatest contrast ratio were almost identical to those obtained in EMBODIMENT 17, the response time was almost doubled by the fact that $\Delta n_{LC} = 0.107$ and the layer thickness of the nematic liquid crystal layer was increased.

[EMBODIMENT 18]

The liquid crystal display device according to still another embodiment of the present invention was fabricated in the same way as in EMBODIMENT 1 except that the twist angle of the nematic liquid crystal layer 12 was set at 200° and the concentration of the chiral dopant in the liquid crystal material was set at 0.81 weight %. The dependency of the electric capacity on the driving voltage of the liquid crystal cell was measured, while applying an AC voltage of 1 kHz thereto. Examining an (electric capacity-driving voltage) curve obtained therefor (corresponding to FIG. 21), Va=2.37 V, Ca=97.6 μF, Co=75.8 μF and α=173 μF/V were found. The threshold voltage (Vth) was obtained, using Eq. [2], starting therefrom and Vth=2.24 V was found.

A phase plate having $\Delta n_1$ of 0.004, $d_1$ of 100 μm and $\Delta n_1 \cdot d_1$ of 400 nm was used for the exit optical anisotropic layer 17a, while a phase plate having $\Delta n_2$ of 0.0053, $d_2$ of 105 μm and $\Delta n_2 \cdot d_2$ of 560 nm was used for the incident optical anisotropic layer 17b.

At this time $\Delta n_{LC} \cdot d_{LC} - (\Delta n_1 \cdot d_1 + \Delta n_2 \cdot d_2) = 0.47$ μm.

Further the angles were set so that $A1 = 125°$, $A2 = 77°$, $B1 = 125°$ and $B2 = 112°$, and the angle formed by the absorbing axes Pa and Pb of the two polarizers 13a and 13b was 90°.

The dependency of the transmittance on the applied voltage of the liquid crystal display device was measured, while applying an AC voltage of 1 kHz thereto. The maximum value of the transmittance was obtained at 2.35 V (Vth×1.05) and it was 16%. The minimum value was obtained at 2.58 V (Vth×1.15) and it was 1.9%. As described above, when the two-valued voltages were on the side of the voltage higher than the threshold voltage and the ratio therebetween was 1.098, a transmittance exceeding 12% was obtained for one of the voltages and a transmittance below 2% was obtained for the other.

The dependency of the contrast ratio on the applied voltage when the liquid crystal display device was driven under the driving condition that duty ratio is 1/200 was measured, while applying an AC voltage of 1 kHz thereto. The peak value of the contrast ratio was obtained at 2.58 V (Vth×1.15) and it was 7.6:1. $V_1$ was set at 2.58 V (Vth×1.15), at which the peak value of the contrast ratio was obtained, and $V_2$ was set at 2.40 V (Vth×1.07). The transmittance at the application of $V_2$ was 14.5%.

The response time was measured at 22° C., while driving the liquid crystal device between the two voltages $V_1$ and $V_2$ and $T_R = 150$ ms and TF = 175 ms were found.

As described above, owing to $\Delta n_{LC} \cdot d_{LC} = 1.43$ μm, $\Delta n_{LC} \cdot d_{LC} - (\Delta n_1 \cdot d_1 + \Delta n_2 \cdot d_2) = 0.47$ μm and $\Delta n_{LC} = 0.22$, the response time and the display quality can be compatible, also when the twist angle is set at 200°.

[EXAMPLE FOR COMPARISON 10]

The incident and the exit optical anisotropic layers 17a and 17b in the liquid crystal display device in EMBODIMENT 18 were replaced by those having $\Delta n_1 = \Delta n_2 = 0.054$, $d_1 = d_2 = 130$ μm, and $\Delta n_1 \cdot d_1 = \Delta n_2 \cdot d_2 = 700$ μm, respectively, $\Delta n_{LC} \cdot d_{LC} - (\Delta n_1 \cdot d_1 + \Delta n_2 \cdot d_2) = 0.17$ μm.

The angles were set so that $A1 = 67°$, $A2 = 83°$, $B1 = 15°$ and $B2 = 119°$. At this time the angle formed by the absorbing axes Pa and Pb of the two polarizers 13a and 13b was 78°.

The dependency of the transmittance on the driving voltage of the liquid crystal display device was measured. The minimum value was obtained at 2.26 V (Vth×0.99) and it was 3.5%. The maximum value of the transmittance was obtained at 2.53 V (Vth×1.13) and it was 21%. When the two voltages $V_1$ and $V_2$ on the side of the voltage higher than the threshold voltage satisfied $0.87 < V_1/V_2 < 1.15$, there was no solution, by which the transmittance was smaller than 2% when one of the voltages was applied thereto and it exceeded 12% for the other.

The greatest contrast ratio, when the liquid crystal display device was driven under the driving condition that duty ratio is 1/200, was obtained at 2.38 V and it was 4.9. $V_1$ was set at 2.38 V (1.06×Vth), at which the greatest contrast ratio was obtained, and $V_2$ was set at 2.22 V (0.99×Vth). the transmittance at $V_1$ was 17%.

The response time was measured at 22° C. and a rise time of $T_R = 350$ ms and a fall time of $T_F = 180$ ms were found. Compared with EMBODIMENT 18, the response time was remarkably elongated.

[EMBODIMENT 19]

In the liquid crystal display device in EMBODIMENT 1, the setting angles of the optical anisotropic layers 17a and 17b and the polarizers 13a and 13b were changed. That is, they were set so that $A1 = 104°$, $A2 = 76°$, $B1 = 100°$ and $B2 = 79°$.

The dependency of the transmittance on the driving voltage of the liquid crystal display device described above was measured by using an AC electric field of 1 kHz. The maximum value of 20.5% was obtained at 2.41 V (Vth×1.05) and the minimum value of 1.8% was obtained at 2.61 V (Vth×1.13).

The dependency of the contrast ratio of the liquid crystal display device described above was measured by using an AC rectangular wave of 1 kHz under a driving condition that duty ratio is 1/200. The peak value of the contrast ratio was obtained at 2.61 V (Vth×1.13) and the value thereof was 9.5.

$V_1$ was set at 2.61 V (Vth×1.13), at which the peak value of the contrast ratio was obtained, and $V_2$ was set at 2.43 V (Vth×1.06). The response time was measured at 22° C. for the two voltages $V_1$ and $V_2$, and a rise time of $T_R$=80 ms and a fall time of $T_F$=190 ms were found.

By the fact that the setting angles of the optical anisotropic layers 17a and 17b and the polarizers 13a and 13b is set as described above, display in the dark state becomes darker, and the contrast ratio is further increased under a condition, where the response time and the display quality are compatible.

[EMBODIMENT 20]

In the present embodiment, in the liquid crystal display device in EMBODIMENT 17, the electrodes 15a and 15b, which were stripe-shaped, were replaced by circular electrodes 15a' and 15b' as indicated in FIG. 14. Apart therefrom, the liquid crystal material, the thickness of the nematic liquid crystal layer, the angles of the optical anisotropic layers and the polarizers, etc. were set completely identically to those used in EMBODIMENT 17.

The dependency of the transmittance on the driving voltage of the electrode part of the liquid crystal display device in the present embodiment was measured by using an AC voltage of 1 kHz. The maximum value of the transmittance was obtained at 2.43 V (Vth×1.06) and it was 20%. The minimum value was obtained at 2.67 V (Vth×1.17) and it was 0.7%. As described above, using the two-valued voltages on the side of the voltage higher than the threshold voltage Vth, having a ratio of 1.079 therebetween, the transmittance exceeded 12% for one of the voltages and it was smaller than 2% for the other.

The dependency of the contrast ratio on the applied voltage of the liquid crystal display device was measured, while driving it, corresponding that duty ratio is 1/200 by applying an AC voltage of 1 kHz thereto. The peak value of the contrast ratio was obtained at 2.67 V (Vth×1.17) and it was 23:1. $V_1$ was set at 2.67 V (Vth×1.17), at which the peak value of the contrast ratio was obtained, and $V_2$ was set at 2.49 V (Vth×1.09). The transmittance at the application of $V_2$ was 16%. The response time was measured at 22° C., while driving the liquid crystal display device between the two voltages $V_1$ and $V_2$, and $T_R$=80 ms and $T_F$=190 ms were found.

As described above, the response time and the display quality can be compatible also in the liquid crystal display device provided with the electrodes 15a' and 15b' having a shape as indicated in FIG. 14.

[EXAMPLE FOR COMPARISON 11]

In this example for comparison, in the liquid crystal display device in EXAMPLE FOR COMPARISON 9, the electrodes 15a and 15b, which were stripe-shaped, were replaced by circular electrodes 15a' and 15b' as indicated in FIG. 14. Apart therefrom, the liquid crystal material, the thickness of the nematic liquid crystal layer, the angles of the optical anisotropic layers and the polarizers, etc. were set completely identically to those used in EMBODIMENT 17.

The dependency of the transmittance on the driving voltage of the electrode part of the liquid crystal display device in the present example for comparison was measured by using an AC voltage of 1 kHz. The minimum value of the transmittance was obtained at 1.42 V (Vth×1.13) and it was 0.9%. However the angles A1, A2, B1 and B2 were set, when the two-valued voltaegs were on the side of the voltage higher than the threshold voltage Vth and the ratio thereof was greater than 0.87 and smaller than 1.15, there was no solution, by which the transmittance exceeded 12% for one of the voltages and was smaller than 2% for the other.

The dependency of the contrast ratio on the applied voltage of the liquid crystal display device was measured, when it is driven, corresponding that duty ratio is 1/200, by applying an AC voltage of 1 kHz thereto. The peak value of the contrast ratio was obtained at 1.42 V (Vth×1.13) and it was 17. $V_1$ was set at 1.42 V (Vth×1.13), at which the peak value of the contrast ratio was obtained, and $V_2$ was set at 1.31 V (Vth×1.02). The transmittance at the application of $V_2$ was 15%. The response time was measured at 22° C., when the liquid crystal display device is driven between the two voltages $V_1$ and $V_2$, and $T_R$=340 ms and $T_F$=870 ms were obtained. This response time is 4.5 times as long as that obtained in EMBODIMENT 20.

As it can be understood from the comparison of the present EXAMPLE FOR COMPARISON 11 with EMBODIMENT 20, the present invention is efficient for a liquid crystal display device having an electrode structure as indicated e.g. in EMBODIMENT 20 and the present EXAMPLE FOR COMPARISON 11 other than a liquid crystal cell provided with stripe-shaped electrodes according to the present invention. In principle it is efficient for liquid crystal display devices having all sorts of electrode structures.

[EMBODIMENT 21]

A liquid crystal display device was fabricated in the completely same way as in EMBODIMENT 17 described above except that the liquid crystal cell was constructed by using substrates 11a and 11b provided with absorbing layers 21a and 21b thereon at least at parts, where there were no electrodes 15a and 15b. The substrates used in the present liquid crystal display device were identical to those indicated in FIG. 17.

The dependency of the transmittance on the driving voltage of the present liquid crystal display device was measured by using an AC electric field of 1 kHz. the maximum value of 18.5% was obtained at 2.43 V (Vth×1.06) and the minimum value of 0.6% was obtained at 2.67 V (Vth×1.17). Since light leak from the parts, where there are no electrodes 15a and 15b, is prevented by the absorbing layers 21a and 21b, the minimum value of the transmittance is further lowered with respect to that obtained by the liquid crystal display device in EMBODIMENT 17.

The dependence of the contrast ratio on the applied voltage was measured, while driving the liquid crystal display device under the driving condition that duty ratio is 1/200. The greatest value of the contrast ratio was obtained at 2.67 V (Vth×1.17) and it was 30:1. $V_1$ was set at 2.67 V (Vth×1.17), at which the greatest value of the contrast ratio was obtained, and $V_2$ was set at 2.49 V (Vth×1.09). The transmittance at the application of $V_2$ was 15%. The response time when the liquid crystal device was driven between the two voltages $V_1$ and $V_2$ was obtained and $T_R=135$ ms and $T_F=160$ ms were found.

As described above, although the brightness is somewhat lowered, the contrast ratio is remarkably improved by the absorbing layers 21a and 21b and in addition the response time remains almost unchanged with respect to that obtained in the case where there are no absorbing layers.

[EMBODIMENT 22]

A liquid crystal display device was fabricated in the completely same way as in EMBODIMENT 16 described above except that the liquid crystal cell was constructed by using substrates 11a and 11b provided with absorbing layers 21a and 21b thereon at least at parts, where there were no electrodes 15a and 15b.

The dependency of the transmittance on the driving voltage of the present liquid crystal display device was measured by using an AC electric field of 1 kHz. the maximum value of 18% was obtained at 2.49 V Vth×1.05) and the minimum value of 0.6% was obtained at 2.63 V (Vth×1.12). Since light leak from the parts, where there are no electrodes, is prevented by the absorbing layers 21a and 21b, the minimum value of the transmittance is further lowered with respect to that obtained by the liquid crystal display device in EMBODIMENT 16.

The dependency of the contrast ratio on the applied voltage was measured, while driving the liquid crystal display device under the driving condition that duty ratio is 1/400. The greatest value of the contrast ratio was obtained at 2.65 V (Vth×1.11) and it was 25. $V_1$ was set at 2.65 V (Vth×1.11), at which the greatest value of the contrast ratio was obtained, and $V_2$ was set at 2.52 V (Vth×1.06). The transmittance at the application of $V_2$ was 15%. The response time when the liquid crystal device was driven between the two voltages $V_1$ and $V_2$ was obtained and $T_R=95$ ms and $T_F=240$ ms were found.

As described above, although the brightness is somewhat lowered, the contrast ratio is remarkably improved by the absorbing layers 21a and 21b and in addition the response time remains almost unchanged with respect to that obtained in the case where there are no absorbing layers.

[EMBODIMENT 23]

In the liquid crystal display device in EMBODIMENT 22, $V_1$ was set at 2.65 V (Vth×1.11) and $V_2$ was set at 2.57 V (Vth×1.08) similarly to EMBODIMENT 22. The transmittance at the application of $V_2$ was 13% and the transmittance at the application of $V_1$ was 0.6%. The ratio of $V_1$ to $V_2$ was 1.036, which corresponded to the drive under the driving condition that duty ratio is 1/800. The contrast ratio, which is the ratio of the transmittance at the application of $V_1$ to the transmittance at the application of $V_2$, was 22:1.

The Stokes' parameters ($S_1$, $S_2$, $S_3$) of the transmitted light at $V_1$ were measured and $S_1=-0.363$, $S_2=0.025$ and $S_3=0.931$ were found. Further the Stokes' parameters ($S_1'$, $S_2'$, $S_3'$) of transmitted light at $V_2$ were measured and $S_1'=-0.645$, $S_2'=-0.676$, $S_3'=-0.356$. The amount of variation $\Delta_{EX}$ in the phase difference at this time was 0.557 $\pi$.

The response time, where the liquid crystal display device was driven between the two voltages $V_1$ and $V_2$, was obtained and $T_R=90$ ms and $T_F=210$ ms were found.

Since the optical setting conditions as described above are adopted in the liquid crystal display device according to the present invention, the dependency of the transmittance on the driving voltage is abrupt and the display quality and the response time can be compatible, also when a highly multiplex driving is effected under the driving condition that duty ratio is 1/800.

[EMBODIMENT 24]

The mixture of the liquid crystal material and the chiral dopant used in EMBODIMENT 17 was injected into a liquid crystal cell for a notebook type personal computer B16NX (fabricated by Hitachi Ltd. Co.). Optical anisotropic layers were disposed between the liquid crystal cell and the polarizers mounted above and below it. Phase plates identical to those used in EMBODIMENT 4 were used for the optical anisotropic layers. The setting angles for the polarizers and the optical anisotropic layers were identical also to those used in EMBODIMENT 17. As the result, a liquid crystal display device having the same dependency of the transmittance on the driving voltage as in EMBODIMENT 17 was obtained. This liquid crystal display device was connected with the notebook type personal computer described above and a pointing device was driven.

The transmittance of this liquid crystal display device is 3.1% at $V_1$ (2.65 V) and 15% at $V_2$ (2.47 V) and shows a normally open type dependency of the transmittance on the driving voltage. The background was displayed in the dark state and the pointer was displayed in the bright state. The moving speed of the pointing device was gradually increased and the state of the pointer was observed.

In the case where the moving speed of the displayed pointer on the screen was 3 cm/s, the displayed pointer image remained unchanged, compared with that observed in a still image. Next, in the case where the moving speed was increased to about 6 cm/s, the displayed pointer image trailed a tail about 3 cm long. For 10 cm/s the displayed pointer image became unclear, but it was possible to confirm the position thereof on the screen.

[EMBODIMENT 25]

In the notebook type personal computer in EMBODIMENT 24 having the normally open type dependency of the transmittance on the driving voltage, the background was displayed in the bright state and the pointer was displayed in the dark state. the moving speed of the pointing device was gradually increased and the state of the pointer was observed.

In the case where the moving speed of the displayed pointer on the screen was 3 cm/s, the displayed pointer image remained unchanged, compared with that observed in a still image. In the case where the moving speed was increased to 7 cm/s, the displayed pointer image trailed a tail about 1 cm long, but the pointer image itself became never unclear Further, when the moving speed was increased to 10 cm/s, the tail of the displayed pointer image was further stretched. However no special abnormalities were recognized in the displayed pointer.

As described above, clearness of the displayed pointer at a high speed movement was further increased owing to the fact that the pointer was displayed in the dark state in the liquid crystal display device having the normally open type dependency of the transmittance of the driving voltage.

[EXAMPLE FOR COMPARISON 12]

The mixture of the liquid crystal material and the chiral dopant used in EXAMPLE FOR COMPARISON 9 was injected into a liquid crystal cell for a notebook type personal computer B16NX (fabricated by Hitachi Ltd. Co.). Optical anisotropic layers were disposed between the liquid crystal cell and the polarizers mounted above and below it. Phase plates identical to those used in EXAMPLE FOR COMPARISON 9 were used for the optical anisotropic layers. The setting angles for the polarizers and the optical anisotropic layers were identical also to those used in EXAMPLE FOR COMPARISON 9. As the result, a liquid crystal display device having the same dependency of the transmittance on the driving voltage as in EXAMPLE FOR COMPARISON 9 was obtained. This liquid crystal display device was connected with the notebook type personal computer described above and a pointing device was driven. The moving speed of the pointing device was gradually increased and the state of the pointer was observed.

In the case where the moving speed of the displayed pointer on the screen was 3 cm/s, the displayed pointer image remained unchanged, compared with that observed in a still image. Next, in the case where the moving speed was increased to about 7 cm/s, the displayed pointer image became unclear and for 10 cm/s it was not displayed.

Clearness of the displayed pointer at the movement of the pointer was worsened, compared with that obtained in EMBODIMENT 25, so that the pointer could not be used any more.

[EMBODIMENT 26]

In the liquid crystal display device in EMBODIMENT 25, variations in the display quality at the scroll were observed. When the scroll was effected with a speed of 3 lines/s, the displayed image remained apparently unchanged, compared with that observed in a still image. In the case where the scroll was effected with a speed of 6 lines/s, display in non-selected parts between two adjacent lines didn't return to the perfect bright state, but it became an obscure display. However it was possible to read-out the display. Further, when the scroll was effected with a speed of 10 lines/s, the display in the non-selected parts between two adjacent lines became more obscure, but the display itself was able to be read-out.

[EXAMPLE FOR COMPARISON 13]

In the liquid crystal display device in EXAMPLE FOR COMPARISON 12, variations in the display quality at the scroll were observed. When the scroll was effected with a speed of 3 lines/s, the displayed image remained unchanged, compared with that observed in a still image. However, when the speed of the scroll was increased to 6 lines/s, the displayed image became unclear. Further, at 10 lines/s, the displayed image was unable to be recognized at all.

In the above, although the present invention has been explained, using various embodiments, the present invention is not restricted to the embodiments described above. For example, the present invention can be applied not only to a transmission type liquid crystal display device but also to a reflection type liquid crystal display device and a projection type liquid crystal display device. Further, the present invention can be applied also to a color display type liquid crystal display device.

As explained above, according to the present invention advantages can be obtained that a high contrast ratio and a bright display can be obtained and that the response speed is so high that it is possible to display a pointer, etc.

We claim:

1. A liquid crystal display device comprising:
   a liquid crystal cell including a first substrate having a first electrode, a second substrate having a second electrode, which is opposite to the first substrate, and a nematic liquid crystal layer disposed between said first substrate and said second substrate;
   a first polarizer disposed outside of said first substrate;
   a second polarizer disposed outside of said second substrate; and
   at least one optically anisotropic layer disposed at least one of between said first substrate and said first polarizer and between said second substrate and said second polarizer;
   wherein a twist angle of said nematic liquid crystal layer is greater than 180°; and
   the following conditions are fulfilled:

$$(\Delta n_{LC} \cdot d_{LC}) \geq 1 \ \mu m,$$

$$(\Delta n_{LC} \cdot d_{LC}) - \sum_{i=1}^{m} (\Delta n_i \cdot d_i) \geq 0.25 \ \mu m,$$

$$\Delta n_{LC} \geq 0.2, \text{ and}$$

$$(\Delta n_{LC} \cdot d_{LC}) - \left\{ \sum_{i=1}^{m} (\Delta n_i \cdot d_i) \right\} \leq 1.88 \ \mu m,$$

where $\Delta n_{LC}$ represents a birefringence of said nematic liquid crystal; $d_{LC}$ a thickness of said nematic liquid crystal layer; $\Delta n_i$ a birefringence of said optically anisotropic layer; $d_i$ a thickness of said optically anisotropic layer; and m a number of optically anisotropic layers.

2. A liquid crystal display device according to claim 1, wherein said twist angle of said nematic liquid crystal layer is in a region between 180° and 300°.

3. A liquid crystal display device according to claim 1, wherein a condition $(\Delta n_{LC} \cdot d_{LC}) \leq 2.5 \ \mu m$, is fulfilled.

4. A liquid crystal display device according to claim 1, wherein a condition $\Delta n_{LC} \leq 0.3$ is fulfilled.

5. A liquid crystal display device according to claim 1, wherein said first substrate has a third electrode, said second substrate has a fourth electrode, and said first, second, third and fourth electrodes form a matrix.

6. A liquid crystal display device according to claim 1, wherein an absorbing axis of said first polarizer and an absorbing axis of said second polarizer form an angle between 60° and 90°, viewed in a direction of a normal to surfaces of said first and said second substrates.

7. A liquid crystal display device according to claim 1, wherein a fast axis of said optically anisotropic layer forms an angle between 60° and 90° with an alignment direction of the one of said first and said second substrates, to which said optically anisotropic layer is closet.

8. A liquid crystal display device according to claim 1, wherein absorbing layers are disposed at a part where said first electrode does not exist on a surface of said first substrate and at a part where said second electrode does not exist on a surface of said second substrate.

9. A liquid crystal display device according to claim 1, wherein said nematic liquid crystal layer contains torans.

10. A liquid crystal display device according to claim 1, wherein in a case where said liquid crystal cell is normally open, a pointer is displayed in a dark state and in a case where said liquid crystal cell is normally closed, said pointer is displayed in a bright state.

11. A liquid crystal display device comprising:
a liquid crystal cell including a first substrate having a first electrode, a second substrate having a second electrode, which is opposite to said first substrate, and a nematic liquid crystal layer disposed between said first substrate and said second substrate;
a first polarizer disposed outside of said first substrate;
a second polarizer disposed outside of said second substrate; and
at least one optically anisotropic layer disposed at least one of between said first substrate and said first polarizer and between said second substrate and said second polarizer;
wherein said liquid crystal display device has characteristics that, in the case where a first driving voltage $V_1$, which is higher than a threshold voltage which is a driving voltage, in the neighborhood of which alignment of a molecular axis of said nematic liquid crystal varies sharply, is applied between said first electrode and said second electrode, transmittance of said liquid crystal display device is smaller than 2% and in the case where a second driving voltage $V_2$, which is higher than said threshold voltage, is applied between said first electrode and said second electrode, transmittance of said liquid crystal display device is greater than 12%, where said first driving voltage $V_1$ and said second driving voltage $V_2$ have a relationship $0.87 \leq (V_1/V_2) \leq 1.15$.

12. A liquid crystal display device according to claim 11, wherein in displaying a pointer on the liquid crystal display device, the minimum value of the driving voltage applied between said first electrode and said second electrode is higher than said threshold voltage.

13. A liquid crystal display device according to claim 11, wherein it is characterized in that, denoting values of Stokes' parameters of a polarized state of transmitted light when said first driving voltage $V_1$ is applied thereto by $(S_1, S_2, S_3)$ and values of Stokes' parameters of the polarized state of said transmitted light when said second driving voltage $V_2$ is applied thereto by $(S_1', S_2', S_3')$, in the case where the polarized state of said transmitted light immediately before the light is injected into the polarizer located on the ejection side is expressed by Stokes' parameters, the parameters fulfill a condition $0.5 \leq 0.5 (1 - S_1 S_1' - S_2 S_2' - S_3 S_3')$.

14. A liquid crystal display device according to claim 11, further comprising means for applying said first driving voltage $V_1$ between said first electrode and said second electrode and means for applying said second driving voltage $V_2$ between said first electrode and said second electrode.

15. A liquid crystal display device according to claim 14, wherein a twist angle of said nematic liquid crystal layer is greater than 180°; and
the following conditions are fulfilled:

$(\Delta n_{LC} \cdot d_{LC}) \geq 1 \mu m,$ $(\Delta n_{LC} \cdot d_{LC}) - \sum_{i=1}^{m} (\Delta n_i \cdot d_i) \geq 0.25 \mu m,$ $\Delta n_{LC} \geq 0.2,$ and where $\Delta n_{LC}$ represents a birefringence of said nematic liquid crystal; $d_{LC}$ a thickness of said nematic liquid crystal layer; $\Delta n_i$ a birefringence of said optically anisotropic layer; $d_i$ a thickness of said optically anisotropic layer; and m a number of optically anisotropic layers.

16. A liquid crystal display device according to claim 15, wherein said twist angle of said nematic liquid crystal layer is in a region between 180° and 300°.

17. A liquid crystal display device according to claim 15, wherein a condition $(\Delta n_{LC} \cdot d_{LC}) \leq 2.5 \mu m$ is fulfilled.

18. A liquid crystal display device according to claim 15, wherein a following condition is fulfilled:

$$(\Delta n_{LC} \cdot d_{LC}) - \left\{ \sum_{i=1}^{m} (\Delta n_i \cdot d_i) \right\} \leq 1.88 \mu m$$

19. A liquid crystal display device according to claim 15, wherein a condition $\Delta n_{LC} \leq 0.3$ is fulfilled.

20. A liquid crystal display device according to claim 15, wherein said first substrate has a third electrode, said second substrate has a fourth electrode, and said first, second, third and fourth electrodes form a matrix.

21. A liquid crystal display device according to claim 15, wherein an absorbing axis of said first polarizer and an absorbing axis of said second polarizer form an angle between 60° and 90°, viewed in a direction of a normal to surfaces of said first and said second substrates.

22. A liquid crystal display device according to claim 15, wherein a fast axis of said optically anisotropic layer forms an angle between 60° and 90° with an alignment direction of the one of said first and or said second substrates, to which said optically anisotropic layer is closet.

23. A liquid crystal display device according to claim 15, wherein absorbing layers are disposed at a part where said first electrode doesn't exist on a surface of said first substrate and at a part where said second electrode doesn't exist on a surface of said second substrate.

24. A liquid crystal display device according to claim 15, wherein said nematic liquid crystal layer contains torans.

25. A liquid crystal display device according to claim 15, wherein in a case where said liquid crystal cell is normally open, a pointer is displayed in a dark state and in a case where said liquid crystal cell is normally closed, said pointer is displayed in a bright state.

26. A liquid crystal display device according to claim 14,
wherein a twist angle of said nematic liquid crystal layer is greater than 180°; and
the following conditions are fulfilled:

$(\Delta n_{LC} \cdot d_{LC}) \geq 1 \mu m,$ $\sum_{i=1}^{m} (\Delta n_i \cdot d_i) < (\Delta n_{LC} \cdot d_{LC}),$ -continued $$\Delta n_{LC} \geq 0.2,$$

where $\Delta n_{LC}$ represents a birefringence of said nematic liquid crystal; $d_{LC}$ a thickness of said nematic liquid crystal layer; $\Delta n_i$ a birefringence of said optically anisotropic layer; $d_i$ a thickness of said optically anisotropic layer; and m a number of optically anisotropic layers.

27. A liquid crystal display device according to claim 26, wherein said twist angle of said nematic liquid crystal layer is in a region between 180° and 300°.

28. A liquid crystal display device according to claim 26, wherein a condition $(\Delta n_{LC} \cdot d_{LC}) \leq 2.5$ μm is fulfilled.

29. A liquid crystal display device according to claim 26, wherein a following condition is fulfilled:

$$0.25 \leq \left\{ \sum_{i=1}^{m} (\Delta n_i \cdot d_i) \right\} / (\Delta n_{LC} \cdot d_{LC}) \leq 0.75.$$

30. A liquid crystal display device according to claim 26, wherein a condition $\Delta n_{LC} \leq 0.3$ is fulfilled.

31. A liquid crystal display device according to claim 26, wherein said first substrate has a third electrode, said second substrate has a fourth electrode, and said first, second, third and fourth electrodes form a matrix.

32. A liquid crystal display device according to claim 26, wherein an absorbing axis of said first polarizer and an absorbing axis of said second polarizer form an angle between 60° and 90°, viewed in a direction of a normal to surfaces of said first and said second substrates.

33. A liquid crystal display device according to claim 26, wherein a fast axis of said optically anisotropic layer forms an angle between 60° and 90° with an alignment direction of the one of said first and or said second substrates, to which said optically anisotropic layer is closet.

34. A liquid crystal display device according to claim 26, wherein absorbing layers are disposed at a part where said first electrode does not exist on a surface of said first substrate and at a part where said second electrode does not exist on a surface of said second substrate.

35. A liquid crystal display device according to claim 26, wherein said nematic liquid crystal layer contains torans.

36. A liquid crystal display device according to claim 26, wherein in a case where said liquid crystal cell is normally open, a pointer is displayed in a dark state and in a case where said liquid crystal cell is normally closed, said pointer is displayed in a bright state.

* * * * *